(12) United States Patent
Akkary

(10) Patent No.: US 6,240,509 B1
(45) Date of Patent: *May 29, 2001

(54) OUT-OF-PIPELINE TRACE BUFFER FOR HOLDING INSTRUCTIONS THAT MAY BE RE-EXECUTED FOLLOWING MISSPECULATION

(75) Inventor: Haitham Akkary, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 31 days.

This patent is subject to a terminal disclaimer.

(21) Appl. No.: 08/991,269

(22) Filed: Dec. 16, 1997

(51) Int. Cl.[7] .................................................. G06F 9/00
(52) U.S. Cl. .......................... 712/228; 712/210; 712/218; 712/240; 711/207
(58) Field of Search .................................... 712/210, 216, 712/217, 218, 239, 240, 228; 711/202, 207

(56) References Cited

U.S. PATENT DOCUMENTS

| | | | |
|---|---|---|---|
| 5,142,634 | 8/1992 | Fite et al. ............................... | 395/587 |
| 5,153,848 | 10/1992 | Elkind et al. ..................... | 364/748.09 |
| 5,309,561 | 5/1994 | Overhouse et al. .................. | 395/553 |
| 5,313,634 | 5/1994 | Eickemeyer .......................... | 712/240 |
| 5,420,990 * | 5/1995 | McKeen et al. ........................ | 712/23 |
| 5,421,021 | 5/1995 | Sainl .................................... | 395/387 |
| 5,524,250 | 6/1996 | Chesson et al. ...................... | 712/228 |
| 5,524,262 * | 6/1996 | Colwell et al. ......................... | 712/23 |
| 5,546,593 | 8/1996 | Kimura et al. ........................ | 712/228 |
| 5,586,278 | 12/1996 | Papworth et al. .................... | 712/235 |
| 5,588,126 | 12/1996 | Abramson et al. .................. | 395/376 |
| 5,606,670 | 2/1997 | Abramson et al. .................. | 711/154 |
| 5,613,083 * | 3/1997 | Glew et al. ........................... | 711/207 |
| 5,664,137 | 9/1997 | Abramson et al. .................. | 395/392 |
| 5,724,565 | 3/1998 | Dubey et al. ........................ | 712/245 |
| 5,742,782 * | 4/1998 | Ito et al. .............................. | 712/210 |
| 5,754,818 * | 5/1998 | Mohamed ............................ | 711/207 |
| 5,802,272 * | 9/1998 | Sites et al. ............................. | 714/45 |
| 5,812,811 * | 9/1998 | Dubey et al. ........................ | 712/216 |
| 5,832,260 * | 11/1998 | Arora et al. ......................... | 712/239 |
| 5,881,280 * | 5/1999 | Gupta et al. ........................ | 712/244 |
| 5,887,166 | 3/1999 | Mallick et al. ...................... | 709/102 |
| 5,933,627 | 8/1999 | Parady ................................ | 712/228 |
| 5,961,639 | 10/1999 | Mallick et al. ...................... | 712/242 |

OTHER PUBLICATIONS

M. Franklin, "The Multiscalar Architecture," Ph.D. Dissertation, Univ. of Wisconsin, 1993, pp. i, ii, v–ix, 50–73, 75–81, 86–107, and 153–161.

(List continued on next page.)

Primary Examiner—Meng-Ai T. An
Assistant Examiner—Gautam R. Patel
(74) Attorney, Agent, or Firm—Alan K. Aldous

(57) ABSTRACT

In one embodiment of the invention, a processor includes an execution pipeline to execute instructions, wherein at least some of the instructions are executed speculatively. The processor also includes a trace buffer outside the execution pipeline to hold the instructions, and wherein instructions that are associated with speculation errors are replayed in the execution pipeline from the trace buffer. In another embodiment, the processor includes an execution pipeline to execute instructions, wherein at least some of the instructions are executed speculatively. The processor also includes a trace buffer outside the execution pipeline to hold instructions and results of the execution of the instructions, wherein at least some of the instructions are subject to an initial retirement following execution in the pipeline, but remain in the trace buffer until a final retirement.

26 Claims, 25 Drawing Sheets

OTHER PUBLICATIONS

Written Opinion cited in a PCT Application corresponding to 08/992,375.

Q. Jacobson et al. "Path–Based Next Trace Prediction," Proceedings of the 30th International Symposium on Microarchitecture, Dec. 1997, pp. 14–23.

Q. Jacobson et al. "Control Flow Speculation in Multiscalar Processors," Proceedings of the 3rd International Symposium on High–Performance Computer Architecture, Feb. 1997, pp. 218–229.

R. Nair, "Dynamic path–based branch correlation," Proceedings of the 28th International Symposium on Microarchitecture, Dec. 1995, pp. 15–23.

S. Palacharla et al., "Complexity–Effective Superscalar Processors," The 24th Annual International Symposium on Computer Architecture, pp. 206–218, June 1997.

M. Lipasti et al., "Value Locality and Load Value Prediction," Proceedings of the Seventh International Conference on Architectural Support for Programming Languages and Operating Systems, Oct. 1996, ASPLOS–VII, pp. 138–147.

J. Smith et al., "The Microarchitecture of Superscaler Processors," Proceedings of IEEE vol. 83, No. 12, Dec. 1995, pp. 1609–1624.

D. Tullsen et al., "Simultaneous Multithreading: Maximizing On–Chip Parallelism," The 22nd International Symposium on Computer Architecture, Jun. 1995, pp. 392–403.

G. Sohi et al., "Multiscaler Processors." The 22nd Annual International Symposium on Computer Architecture, Jun. 1995, pp. 414–425.

E. Rotenberg et al., "Trace Processors," The 30th International Symposium on Microarchitecture, Dec. 1997, pp. 138–148.

M. Franklin et al., "ARB: A Hardware Mechanism for Dynamic Reordering of Memory References. IEEE Transactions on Computers", vol. 45, No. 5, May 1996, pp. 552–571.

J. Tsai et al., "The Superthreaded Architecture: Thread Pipelining with Run–Time Data Dependence Checking and Control Speculation," Proceedings of the 1996 Conference on Parallel Architectures and Compilation Techniques, Oct. 1996, pp. 35–46.

P. Song, "Multithreading Comes of Age," Microprocessor Report, Jul. 14, 1997, pp. 13–18.

Patent Application Ser. No. 08/746,547, field Nov. 13, 1996, pending, "Processor Having Replay Architecture," Inventor David Sager.

* cited by examiner

| PROGRAM AND RETIRE ORDER | THREAD ID NUMBER 198 |
|---|---|
| 1 | THREAD ID 1  (T1) |
| 2 | THREAD ID 3  (T3) |
| 3 | THREAD ID 2  (T2) |
| 4 | THREAD ID 4  (T4) |

AT TIME T1

| PROGRAM AND RETIRE ORDER | THREAD ID NUMBER 198 |
|---|---|
| 1 | THREAD ID 3  (T3) |
| 2 | THREAD ID 2  (T2) |
| 3 | THREAD ID 4  (T5) |
| 4 | THREAD ID 1  (T6) |

AT TIME T2

FIG. 9

| INSTR ID | OP CODE | DEST | SOURCE 1 | SOURCE 2 | INDEX FOR SOURCE 1 | VALID SOURCE 1 | INDEX FOR SOURCE 2 | VALID SOURCE 2 | SBID | LBID |
|---|---|---|---|---|---|---|---|---|---|---|
| 0 | MULT | R1 | R1 | R2 | X | 0 | X | 0 | | |
| 1 | MULT | R2 | R3 | R4 | X | 0 | X | 0 | | |
| 2 | ADD | R1 | R1 | R2 | 0 | 1 | 1 | 1 | | |
| 3 | ADD | R4 | X | R1 | X | 0 | 2 | 1 | | |
| 4 | STORE | MX | X | R2 | X | 0 | 1 | 1 | | |
| 5 | STORE | MY | X | R1 | X | 0 | 2 | 1 | | |

INSTRUCTION QUEUE ARRAY 202A

FIG. 12

| INSTR ID | VALUE OR PRID | STATUS (2 bit) | REPLAY COUNT | DEPENDENCY FIELD | | | |
|---|---|---|---|---|---|---|---|
| | | | | R4 | R3 | R2 | R1 |
| 0 | | | | 0 | 0 | 1 | 1 |
| 1 | | | | 1 | 1 | 0 | 0 |
| 2 | | | | 1 | 1 | 1 | 1 |
| 3 | | | | 1 | 1 | 1 | 1 |
| 4 | | | | 1 | 1 | 0 | 0 |
| 5 | | | | 1 | 1 | 1 | 1 |

DATA AND DEPENDENCY ARRAY

|  | MODIFIED REGISTERS | | | | | MODIFIERS | | | |
|---|---|---|---|---|---|---|---|---|---|
|  | R4 | R3 | R2 | R1 | 240 | R4 | R3 | R2 | R1 |
|  | 0 | 0 | 0 | 0 |  | X | X | X | X |
|  |  |  |  |  |  | 236 | 234 | 232 | 230 |
| I0 | 0 | 0 | 0 | 1 |  | X | X | X | 0 |
| I1 | 0 | 0 | 1 | 1 |  | X | X | 1 | 0 |
| I2 | 0 | 0 | 1 | 1 |  | X | X | 1 | 2 |
| I3 | 1 | 0 | 1 | 1 |  | 3 | X | 1 | 2 |
| I4 | 1 | 0 | 1 | 1 |  | 3 | X | 1 | 2 |
| I5 | 1 | 0 | 1 | 1 |  | 3 | X | 1 | 2 |

| SBID | LBID | INSTR ID | OP CODE | STORE ADDR | SB ADD VALID | DATA | SB DATA VALID | RETIRED | REPLAY COUNT |
|---|---|---|---|---|---|---|---|---|---|
| 0 | 0 | | STORE 0 | | | | | | |
| 1 | 0 | | STORE 1 | | | | | | |
| 2 | 1 | | STORE 2 | | | | | | |
| 3 | 2 | | STORE 3 | | | | | | |
| 4 | 2 | | STORE 4 | | | | | | |
| | | | | | | | | | |

184A — STORE BUFFER

FIG. 23

| LBID | SBID | INSTR ID | OP CODE | LOAD ADDR | ENTRY VALID | PRID | SB HIT | SBID | STATUS THREAD ID | REPLAY COUNT |
|---|---|---|---|---|---|---|---|---|---|---|
| 0 | 1 | | LOAD 0 | | | | | | | |
| 1 | 2 | | LOAD 1 | | | | | | | |
| 2 | 4 | | LOAD 2 | | | | | | | |
| 3 | | | | | | | | | | |
| | | | | | | | | | | |
| | | | | | | | | | | |
| | | | | | | | | | | |

182A — LOAD BUFFER

FIG. 24

TREE AT TIME t1

TREE AT TIME t2
ASSUMING
THREAD T4 IS
RESET BEFORE
THREAD T1
RETIRES

TREE AT TIME t2
ASSUMING
THREAD T1
RETIRES BEFORE
THREAD T4 IS
RESET

TREE AT TIME t3
AFTER THREAD
T1 HAS RETIRED
AND THREAD T4
IS RESET

TREE AT TIME t1

TREE AT TIME t2

OUT-OF-PIPELINE TRACE BUFFER FOR HOLDING INSTRUCTIONS THAT MAY BE RE-EXECUTED FOLLOWING MISSPECULATION

RELATED APPLICATIONS

The present application and application Ser. No. 08/992,375 entitled "Processor Having Multiple Program Counters and Trace Buffers Outside an Execution Pipeline" and application Ser. No. 08/991,734 entitled "memory System for Ordering Load and Store Instructions in a Processor That Performs Out-Of-Order Multithread Execution", filed concurrently herewith, have essentially common specifications.

BACKGROUND OF THE INVENTION

1. Technical Field of the Invention

The present invention relates to processors and, more particularly, to processors having one or more trace buffers.

2. Background Art

Current superscaler processors, such as microprocessors, perform techniques such as branch prediction and out-of-order execution to enhance performance. Processors having out-of-order execution pipelines execute certain instructions in a different order than the order in which the instructions were fetched and decoded. Instructions may be executed out of order with respect to instructions for which there are not dependencies. Out-of-order execution increases processor performance by preventing execution units from being idle merely because of program instruction order. Instruction results are reordered after execution.

The task of handling data dependencies is simplified by restricting instruction decode to being in-order. The processors may then identify how data flows from one instruction to subsequent instructions through registers. To ensure program correctness, registers are renamed and instructions wait in reservation stations until their input operands are generated, at which time they are issued to the appropriate functional units for execution. The register renamer, reservation stations, and related mechanisms link instructions having dependencies together so that a dependent instruction is not executed before the instruction on which it depends. Accordingly, such processors are limited by in-order fetch and decode.

When the instruction from the instruction cache misses or a branch is mis-predicted, the processors have either to wait until the instruction block is fetched from the higher level cache or memory, or until the mis-predicted branch is resolved, and the execution of the false path is reset. The result of such behavior is that independent instructions before and after instruction cache misses and mis-predicted branches cannot be executed in parallel, although it may be correct to do so.

A variety of speculations may lead to speculation errors. There is a need for improved mechanisms in a processor that allow the processor to recover from speculation errors.

SUMMARY OF THE INVENTION

In one embodiment of the invention, a processor includes an execution pipeline to execute instructions, wherein at least some of the instructions are executed speculatively. The processor also includes a trace buffer outside the execution pipeline to hold the instructions, and wherein instructions that are associated with speculation errors are replayed in the execution pipeline from the trace buffer.

In another embodiment, the processor includes an execution pipeline to execute instructions, wherein at least some of the instructions are executed speculatively. The processor also includes a trace buffer outside the execution pipeline to hold instructions and results of the execution of the instructions, wherein at least some of the instructions are subject to an initial retirement following execution in the pipeline, but remain in the trace buffer until a final retirement.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 9 illustrates an array indicating program and retirement orders at two times.

FIG. 12 is a graphical representation of portions of one embodiment of an instruction queue array of the trace buffer of FIG. 10.

FIG. 13 is a graphical representation of portions of one embodiment of a data and dependency array of the trace buffer of FIG. 10.

FIG. 23 is a graphical representation of portions of one embodiment of a store buffer of one of the MOBs of FIG. 22.

FIG. 24 is a graphical representation of portions of one embodiment of a load buffer of one of the MOBs of FIG. 22.

DETAILED DESCRIPTION OF PREFERRED EMBODIMENTS

Figure 1:
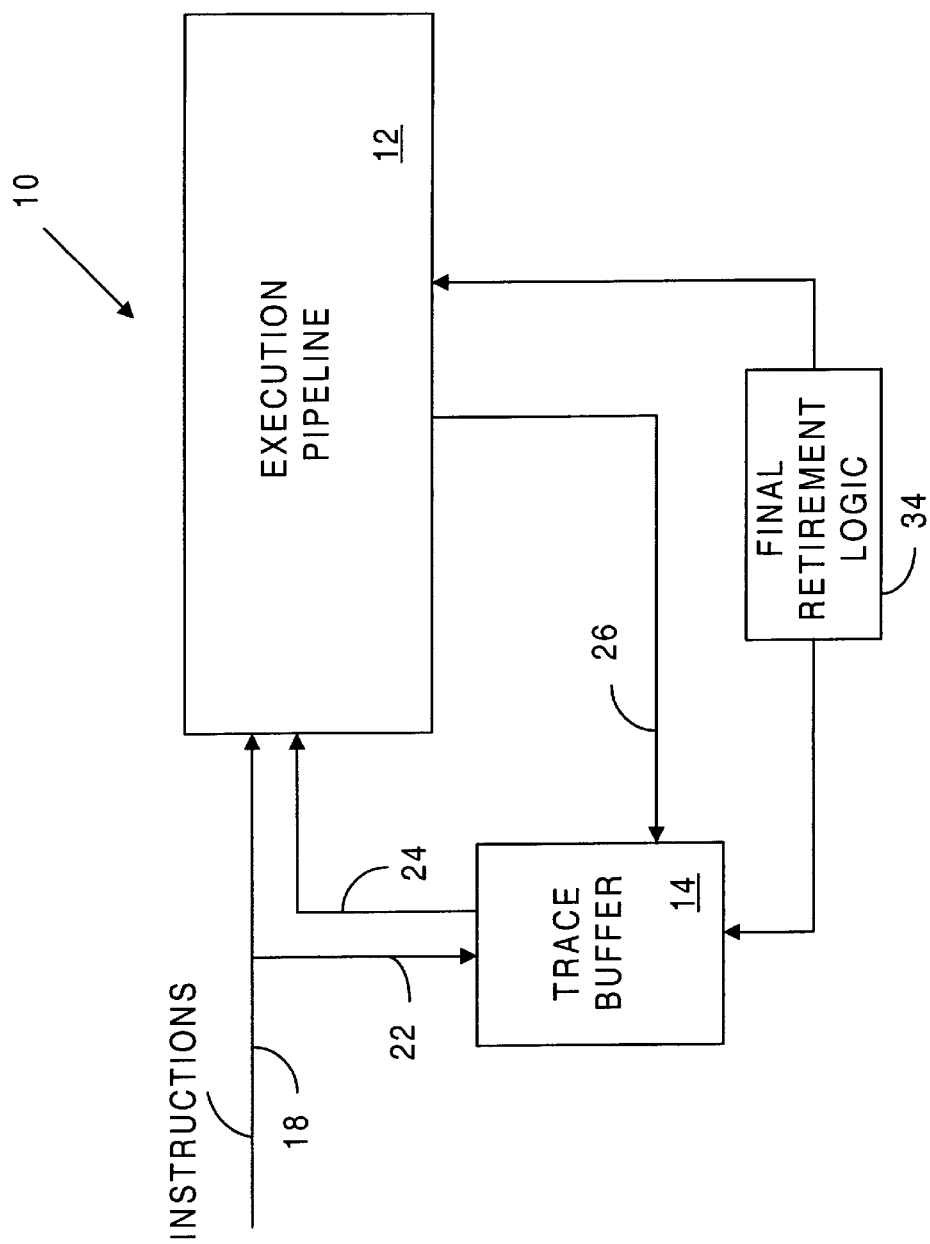
FIG. 1 is a high level block diagram representation of certain components in one embodiment of a processor.

A. Creation of Threads and Overview of Pipeline 108
B. Details Regarding Trace Buffers 114
   1. Trace Buffer 114A
      a. Instruction Queue Array 202A
      b. DAD Array 206A and Dependency Generation Circuitry 212A
      c. Output Register File 210A and Input Register File 208A
   2. Trace Buffer 114'
C. A Replay Sequence Algorithm
D. Second Level or Final Retirement
E. Memory System
   1. Store Buffers and Load Buffers
   2. Comparisons of Load and Store Addresses
      a. Execution of Load Instructions
      b. Execution of Store Instructions
      c. Reset
   3. Replay of Store Instructions
   4. Replays of Multiple Load Instructions
   5. Final Retirement of Load and Store Instructions F. Additional Information Regarding Thread Management Logic and Final Retirement Logic
G. An Embodiment Without Multithreading
H. Additional Information and Embodiments FIG. 1 illustrates certain components of a processor 10. Processor 10 includes an execution pipeline 12 and a trace buffer 14, which is outside execution pipeline 12. Execution pipeline 12 may include a memory order buffer. Instructions on conductors 18 are provided to execution pipeline 12 for execution. The instructions are also provided through conductors 22 to trace buffer 14. The instructions may be executed speculatively in execution pipeline 12. Examples of the speculation include data speculation and dependency speculation. Any of a wide variety of speculations may be involved. Processor 10 includes mechanisms, including in trace buffer 14, to detect speculation errors (misspeculations) and to recover from them.

When a misspeculation is detected, the misspeculated instruction is provided to execution pipeline 12 from trace buffer 14 through conductors 24 and is replayed in execution pipeline 12. If an instruction is "replayed," the instruction and all instructions dependent on the instruction are re-executed, although not necessarily simultaneously. If an instruction is "replayed in fall," the instruction and all instructions following the instruction in program order are re-executed. The program order is the order the instructions would be executed in an in order processor. Instructions may pass through conductors 18 entirely in program order or in something other than program order. Processor 10 may be an in order or out-of-order processor. The re-execution of a dependent instruction may result in instructions which are dependent on the dependent instruction being replayed. The number of re-executions of instructions can be controlled by controlling the events which trigger replays. In general, the term execute may include original execution and re-execution. Results of at least part of the instructions are provided to trace buffer through conductors 26. Final retirement logic 34 finally retires instructions in trace buffer 14 after it is assured that the instructions were correctly executed either originally or in re-execution.

Execution pipeline 12 may be any of a wide variety execution pipelines and may be a section of a larger pipeline. Execution pipeline 12 may be used in connection with a wide variety of processors. Examples are provided in FIG. 2 which illustrates components of a processor 50 having an execution pipeline 108, and in FIG. 3 which illustrates a processor 100 having an execution pipeline 308. In the embodiment of the invention in FIG. 2, execution pipeline 108 includes register renaming. In other embodiments, the execution pipeline does not include register renaming. The processor may concurrently process multiple threads (as in the case of processor 50 in FIG. 2), or not concurrently process multiple threads (as in the case of processor 100 in FIG. 3). Processor 50 will be discussed first.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A. Creation of Threads and Overview of Pipeline 108

Instructions are provided through conductors 102 to an instruction cache (I-cache) 104. A decoder 106 is illustrated as receiving instructions from I-cache 104, but alternatively could decode instructions before they reach I-cache 104. Depending on the context and implementation chosen, the term "instructions" may include macro-operations (macroop), micro-operations (uops), or some other form of instructions. Any of a variety of instruction sets may be used including, but not limited to, reduced instruction set computing (RISC) or complex instruction set computing (CISC) instructions. Further, decoder 106 may decode CISC instructions to RISC instructions. Instructions from I-cache 104 are provided to pipeline 108 through MUX 110 and to trace buffers 114 through, conductors 118.

A trace is a set of instructions. A thread includes the trace and related signals such as register values and program counter values.

Thread management logic 124 creates different threads from a program or process in I-cache 104 by providing starting counts to program counters 112A, 112B, . . . , 112X, through conductors 130 (where X represents the number of program counters). As an example, X may be 4 or more or less. Thread management logic 124 also ends threads by stopping the associated program counter. Thread management logic 124 may cause the program counter to then begin another thread. Portions of different threads are concurrently read from I-cache 104.

To determine where in a program or process to create a thread, thread management logic 124 may read instructions from decoder 106 through conductors 128. The threads may include instructions inserted by a programmer or compiler that expressly demarcate the beginning and ending of threads. Alternatively, thread management logic 124 may analyze instructions of the program or process to break up a program or process supplied to I-cache 104 into different threads. For example, branches, loops, backward branches, returns, jumps, procedure calls, and function calls may be good points to separate threads. Thread management logic 124 may consider the length of a potential thread, how many variables are involved, the number of variables that are common between successive threads, and other factors in considering where to start a thread. Thread management logic 124 may consider the program order in determining the boundaries of threads. The program order is the order the threads and the instructions within the threads would be executed on an in order processor. The instructions within the threads may be executed out of order (contrary to program order). The threads may be treated essentially independently by pipeline 108. Thread management logic 124 may include a prediction mechanism including a history table to avoid making less than optimal choices. For example, thread management logic 124 may create a thread and then later determine that the thread was not actually part of the program order. In that case, if the same code is encountered again, the prediction mechanism could be used to determine whether to create that same thread again.

Dynamically creating threads is creating threads from a program that was not especially written or compiled for multithreading, wherein at least one of the threads is dependent on another of the threads. The program may originate from off a chip that includes execution pipeline 108 and thread management logic 124. Dynamically creating the threads, executing the threads, and detecting and correcting speculation errors in the execution is referred to as dynamic multithreading.

Figure 4:
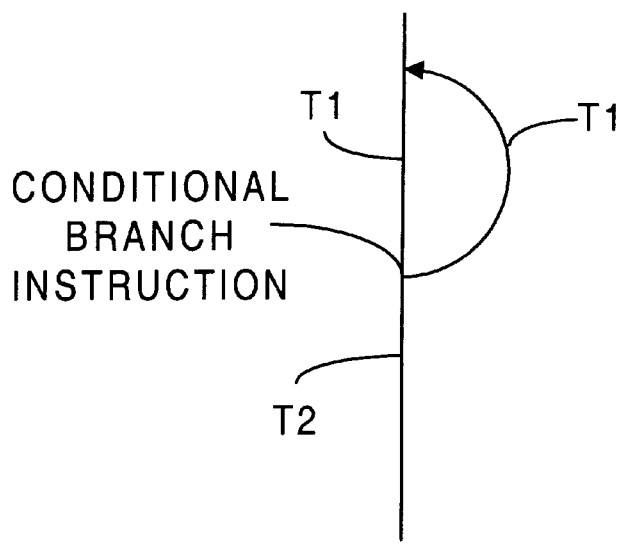
FIG. 4 is a flow diagram of an example of two threads.

FIG. 4 illustrates a thread T1 that includes a conditional backward branch instruction. In program order, thread T2 is executed following the conditional branch instruction. In time order, thread T2 is executed speculatively beginning at the time thread T1 first reaches the conditional branch instruction. Therefore, portions of thread T1 and T2 are executed concurrently. If thread T2 involves misspeculations, the effected instructions of thread T2 are replayed.

Thread management logic 124 may monitor the count of the program counters through conductors 130. A purpose of monitoring the count is to determine when a thread should end. For example, when the condition of the conditional branch is not met, if the program counter of thread T1 were allowed to continue, it would advance to the first instruction of thread T2. Therefore, thread management logic 124 stops the program counter of thread T1 when the condition is not met.

Figure 5:
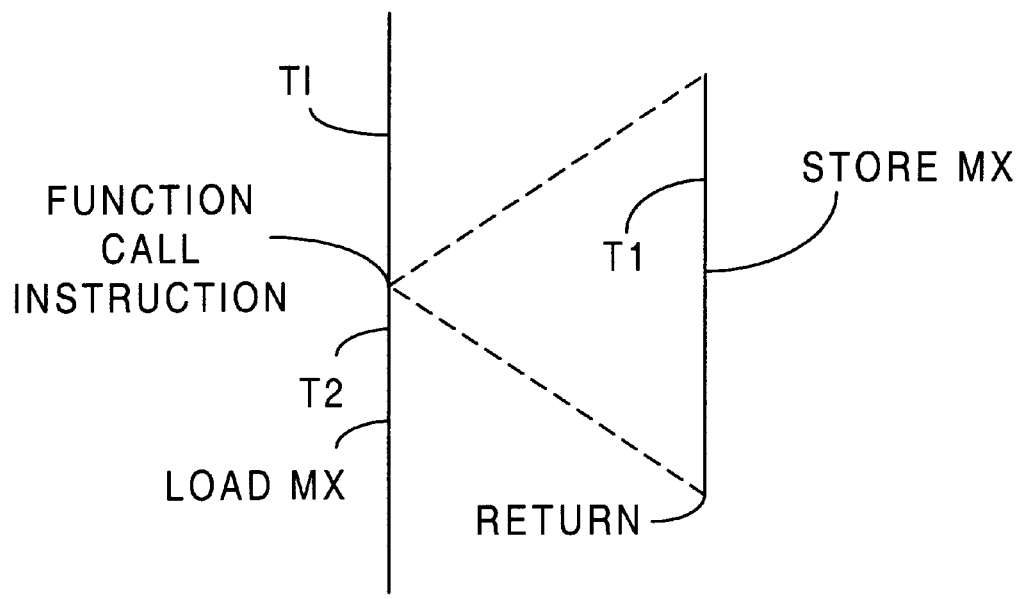
FIG. 5 is a flow diagram of another example of two threads.

FIG. 5 illustrates a thread T1 that includes a function call instruction. In program order, when the call instruction is reached, the program counter jumps to the location of the function and executes until a return instruction, at which time the program counter returns to the instruction after the call. In program order, thread T2 begins at the instruction following the return. In time order, thread T2 is executed speculatively beginning at the time thread T1 first reaches the call. If thread T2 involves misspeculations, the effected instructions of thread T2 are replayed. Thread T1 ends when its program counter reaches the first instruction of thread T2. The Load MX and Store MX instructions in FIG. 5 will be discussed below.

Figure 6:
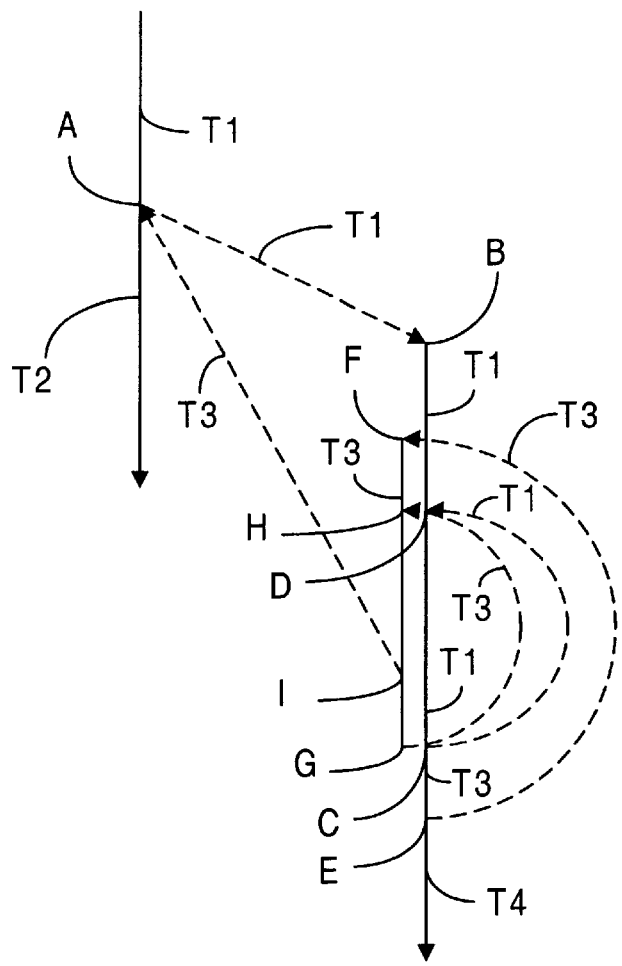
FIG. 6 is a flow diagram of an example of four threads.

FIG. 6 illustrates threads T1, T2, T3, and T4 which are part of a section of a program. Different program counters produce threads T1, T2, T3, and T4. Thread T1 includes instructions to point A (function call instruction) and then from point B, to point C (conditional backward branch instruction), to point D and to point C again (the loop may be repeated several times). Tread T2 begins at the instruction that in program order is immediately after the return instruction of the function that is called at point A. Thread T3 begins at the instruction that in program order is immediately after the conditional backward branch of point C and continues to point E, to point F, to point G, to point H, and to point I, which is a return instruction to the instruction immediately following point A where thread T2 begins. Thread T4 begins at the instruction that in program order is immediately after the conditional backward branch at point E.

Figure 7:
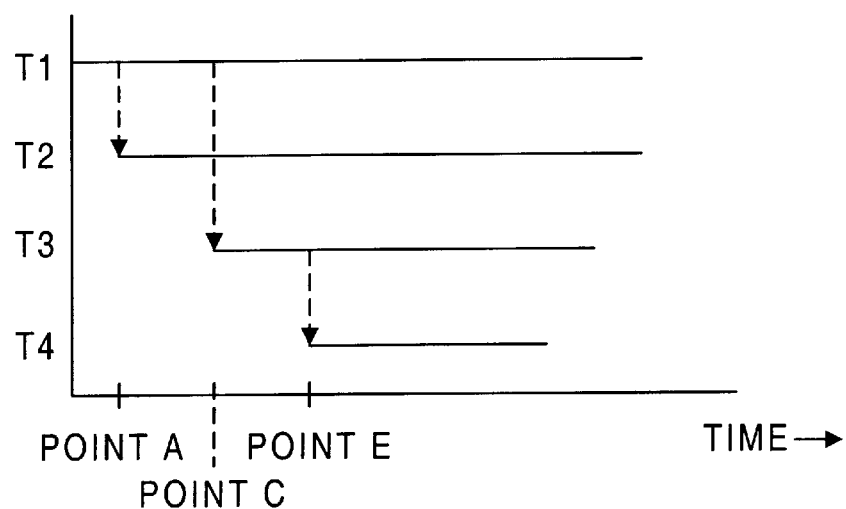
FIG. 7 is a graph showing overlapping execution of the threads of FIG. 6.

As illustrated in FIG. 7, portions of threads T1, T2, T3, and T4 are fetched, decoded, and executed concurrently. The threads are fetched, decoded, and executed out of order because the program order is not followed. In time order, execution of threads T2, T3, and T4 begins immediately following instructions at points A, C, and E, respectively. The vertical dashed lines show a parent child relationship. Threads T2, T3, and T4 are executed speculatively by relying on data in registers and/or memory locations before it is certain that the data is correct. Processor 100 has mechanisms to detect misspeculation and cause misspeculated instructions to be replayed. It turns out that thread T4 is not part of the program order. Thread T4 may be executed until thread management logic 124 determines that thread T4 is not part of the program order. At that time, thread T4 may be reset and the resources that held or process thread T4 in processor 100 may be deallocated and then allocated for another thread. In program order, threads T1, T2, and T3 would be executed as follows: first thread T1, then thread T3, and then thread T2.

Figure 2:
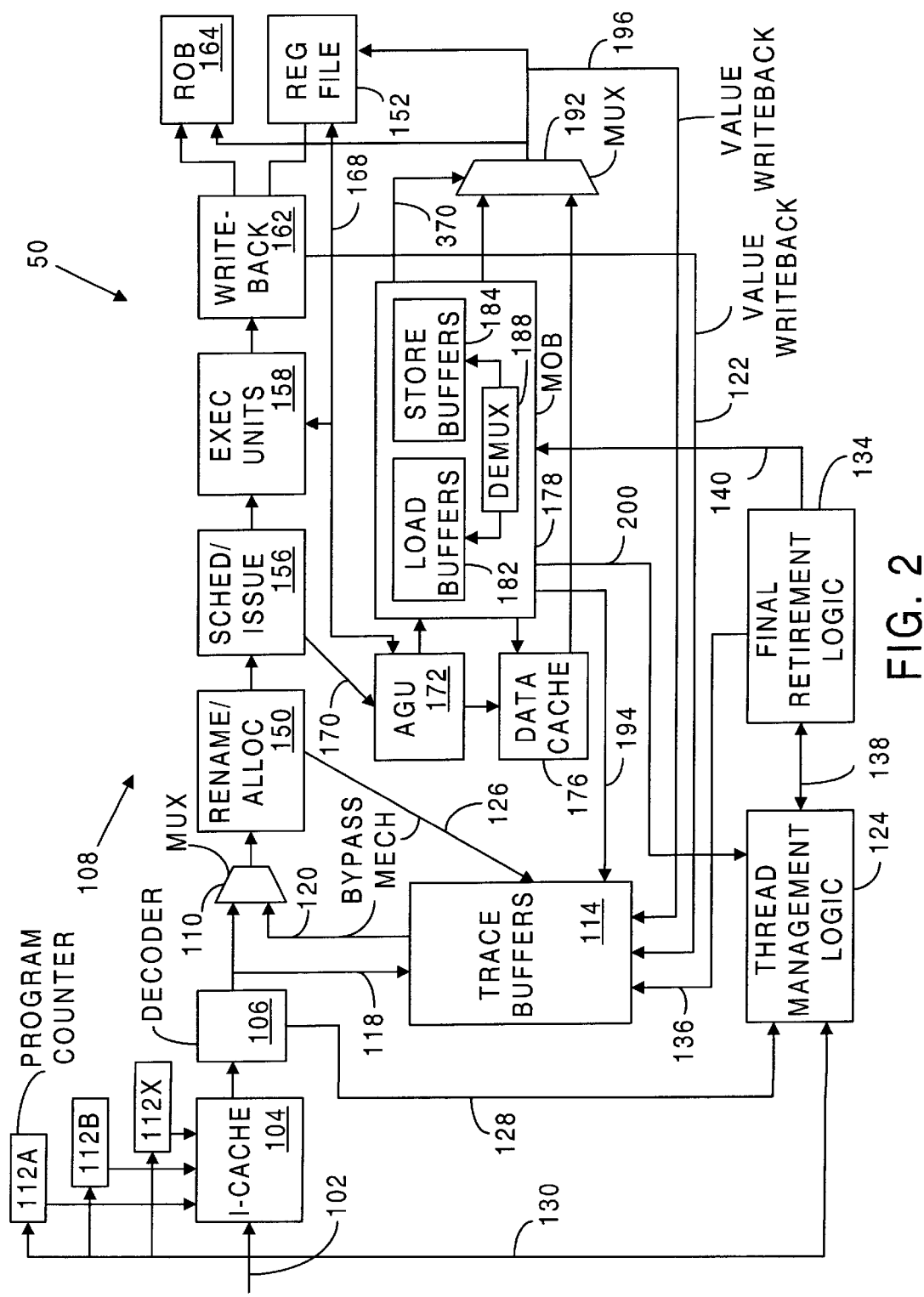
FIG. 2 is a block diagram of a processor according to one embodiment of the invention.

Referring to FIG. 2, instructions from MUI 110 are received by rename/allocate unit 150 which provides a physical register identification (PRID) of the renamed physical register in register file 152. The PRID is provided to trace buffer 114 through bypass conductors 126. Allocation involves assigning registers to the instructions and assigning entries of the reservation stations of schedule/issue unit 156. Once the operands are ready for a particular instruction in the reservation stations, the instruction is issued to one of the execution units (e.g., integer, floating point) of execution units 158 or a memory execution pipeline which includes address generation unit (AGU) 172, memory order buffer (MOB) 178, and data cache 176. Depending on the instructions, operands may be provided from register file 152 through conductors 168. Under one embodiment of the invention, dependent instructions within a thread may be so linked that they are not executed out-of-order. However, dependent instructions from different threads may be concurrently fetched, decoded, and executed out-of-order. The execution of certain of the threads may be speculative.

For high performance, reservation stations and related mechanisms are designed to have both low latency and high bandwidth issue of instructions. The latency and bandwidth requirements place restrictions on the number of instructions that can be waiting in the reservation stations. By positioning trace buffers 114 outside pipeline 108, a large number of instructions can be available for execution/replay without significantly decreasing throughput of pipeline 108. The effect of latency between execution pipeline 108 and trace buffers 114 can be reduced through pipelining.

The result of an execution and related information are written from writeback unit 162 through conductors 122 (in the case of registers) and through MUX 192 and conductors 196 to trace buffers 114. The results and related information may also be written to register file 152 and associated re-order buffer (ROB) 164. Once the result and information of an instruction are written to register file 152 and ROB 164, the instruction is retired in order as far as pipeline 108 is concerned. This retirement is called a first level or initial retirement. At or before the first level retirement, resources for the retired instruction in schedule/issue unit 156 including the reservation stations, register file 152, and ROB 164 are deallocated. However, all needed details regarding the instruction are maintained in trace buffers 114 and MOB 178 until a final retirement, described below.

A dependency exists between a later thread and an earlier thread when in program order, data used in the later thread is produced in the earlier thread. The data may have been produced in the earlier thread through a memory or non-memory instruction. For example, the later thread may be dependent on the earlier thread if a load instruction in the later thread has the same address as a store instruction in the earlier thread. The later thread may also be dependent on the earlier thread if an instruction in the later thread involves a register that was modified in the earlier thread. Likewise, a later instruction is dependent on an earlier instruction when in program order the later instruction uses data produced by the earlier instruction. The word "dependency" is also used in the phrase "dependency speculation." An example of a dependency speculation is speculating that there is no dependency between a load instruction and an earlier store instruction. Address matching is an example of a technique for checking for dependency speculation errors. An example of data speculation is speculating that the data in a register is the correct data. Register matching is an example of a technique for checking for data speculation errors.

B. Details Regarding Trace Buffers 114

Figure 8:
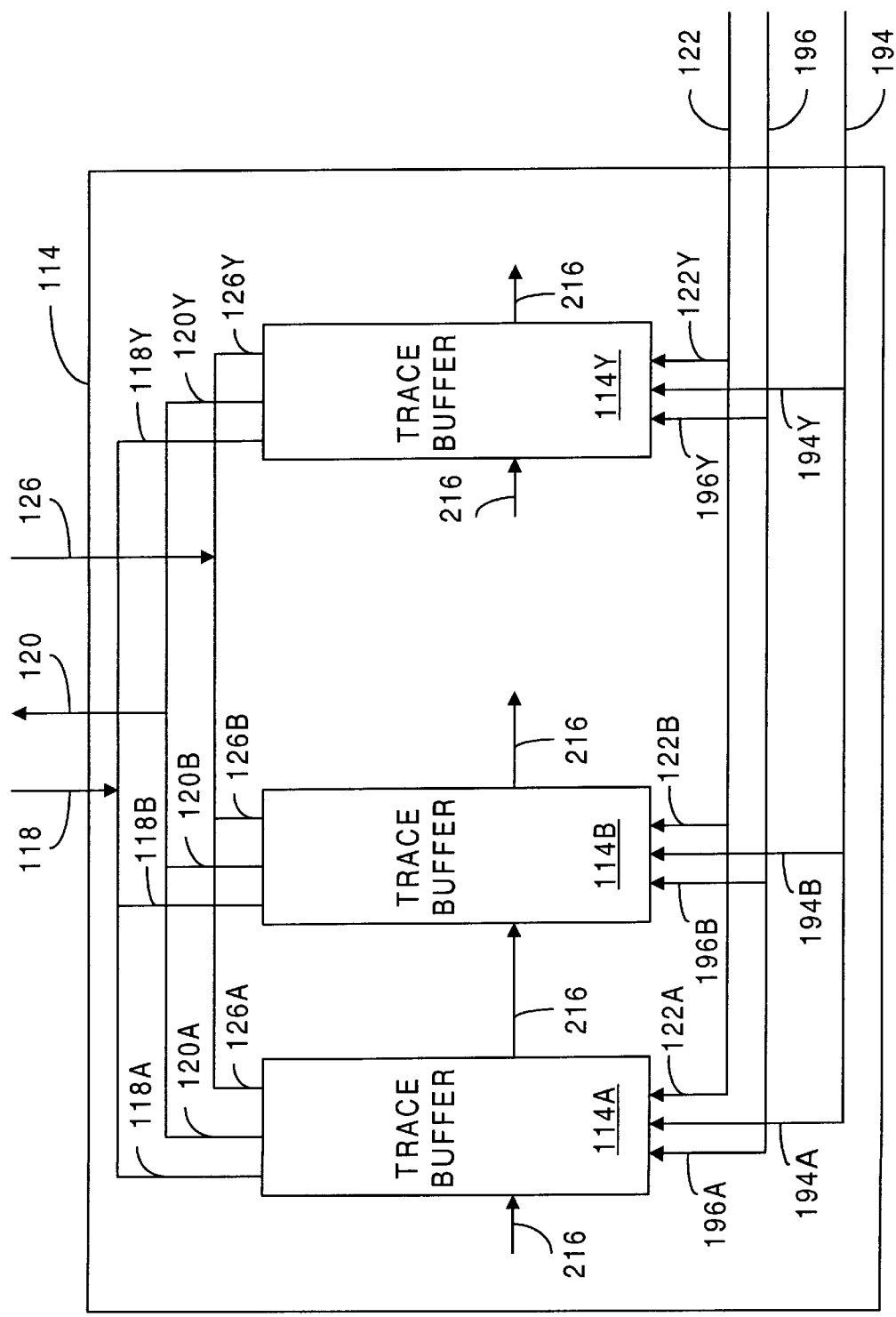
FIG. 8 is a block diagram illustrating individual trace buffers according to one embodiment of the invention.

Referring to FIG. 8, trace buffers 114 include trace buffers 114A, 114B, 114C, ..., 114Y, where Y presents the number of trace buffers. For example, if Y=4 (i.e., Y=D), there are 4 trace buffers. If Y is less than 3, trace buffers 114 does not include all the trace buffers shown in FIG. 8. Y may be the same as or different than X (the number of program counters). Trace buffers 114 may be a single memory divided into individual trace buffers, or physically separate trace buffers, or some combination of the two.

Referring to FIG. 9, in one embodiment, thread management logic 124 includes an array 198 that specifies the program order (which is also the retirement order) of thread IDs. In the example, each trace buffer has a unique thread ID or a one-to-one mapping to a thread ID. For example, trace buffer 114A is assigned thread ID 1, trace buffer 114B is assigned thread ID 2, etc. The thread IDs may be hardwired or programmed. In one embodiment, each program counter is associated with a particular thread ID and trace buffer. (Alternatively, there is not such a restricted relationship.)

FIG. 9 shows an example of the retirement order of threads at time t1 and time t2. In the example, there are only four trace buffers and four thread IDs. The associated thread numbers are shown in parenthesis. Depending on the implementation, the thread number in parenthesis is not actually included in array 198. At time t1, the program and retirement order is thread T1, T3, T2, and T4, as in the example of FIG. 6. Between time t1 and time t2, it is determined that thread T4 is not in the program order. Therefore, thread T4 is reset, making room for thread T5 (not shown in FIG. 5) in trace buffer 114D. Thread T5 is associated with thread ID 4. Thread T1 retires, making room for thread T6 in trace buffer 114A. Thread T6 is associated with thread ID 1. At time t2, the program and retirement order is thread T3, T2, T5, and T6. (If thread T1 retired before thread T4 was reset, then threads T5 and T6 would have had different thread IDs, but program and retirement order would not be changed). Depending on the algorithm used, it may have been that thread T2 was initially before thread T3 in array 198, but the program and retirement order would be corrected, as array 198 at time t1.

As mentioned, the program order of threads is the order the threads would be executed on an in order processor. The program order of instructions is the order the instructions would be executed on an in order processor. Thread management logic 124 does not necessarily initially determine the true program order for the threads. However, thread management logic 124 does eventually determines the true program order.

Referring to FIG. 8, trace buffers 114A, 114B, ..., 114Y receive instructions through conductors 118A, 118B, ... 118Y, which are connected to conductors 118. There may be demultiplexing circuitry between conductors 118A, 118B, ..., 118Y and conductors 118. Alternatively, enable signals may control which trace buffer is activated. Still alternatively, there may be enough parallel conductors to handle parallel transactions. Trace buffers 114A, 114B, ..., 114Y supply instructions and related information for replay to pipeline 108 through conductors 120A, 120B, ... 120Y, which are connected to conductors 120. It is noted that multiple instructions from trace buffers 114 may concurrently pass through conductors 120 and MUX 110 for re-execution. At the same time, multiple instructions from decoder 106 may also pass through MUX 110 for the first time. A thread ID and instruction ID (instr ID) accompany each instruction through the pipeline. A replay count may also accompany the instruction. In the case of load and store instructions, a load buffer ID (LBID) and a store buffer ID (SBID) may also accompany the instruction. In one embodiment, the LBID and SBID accompany every instruction, although the LBID and SBID values may be meaningless in the case of instructions which are not loads or stores. As described below, a PRID or value may also accompany an instruction being re-executed. Trace buffers 114A, 114B, . . . , 114Y receive PRID, LBID, and SBID values from rename/allocate unit 150 through bypass conductors 126A, 126B, . . . 126Y, which are connected to conductors 126. Trace buffers 114A, 114B, . . . , 114Y receive writeback result information and related signals through conductors 122A, 122B, . . . , 122Y, which are connected to conductors 122, and through conductors 196A, 196B, . . . , 196Y, which are connected to conductors 196. Replay signals are provided through conductors 194A, 194B, . . . , 194Y, which are connected to conductors 194. Multiplexing and/or enable circuitry and/or a substantial number of parallel conductors may be used in conductors 120, 126, 122, 194, and 196. The trace buffers may be identical or somewhat different.

Figure 10:
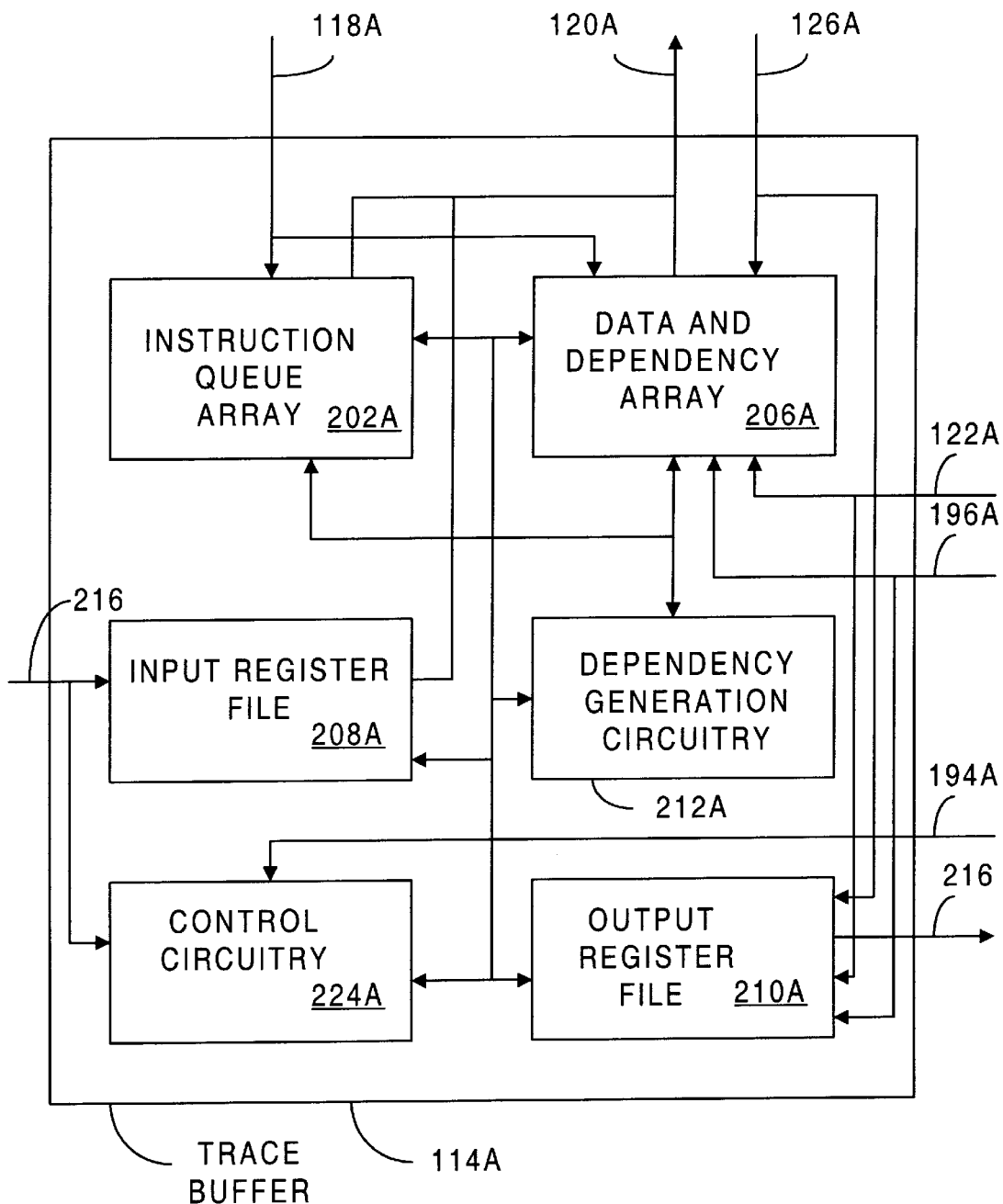
FIG. 10 is a block diagram representation of certain components in one embodiment of a trace buffer of FIG. 8.
Figure 11:
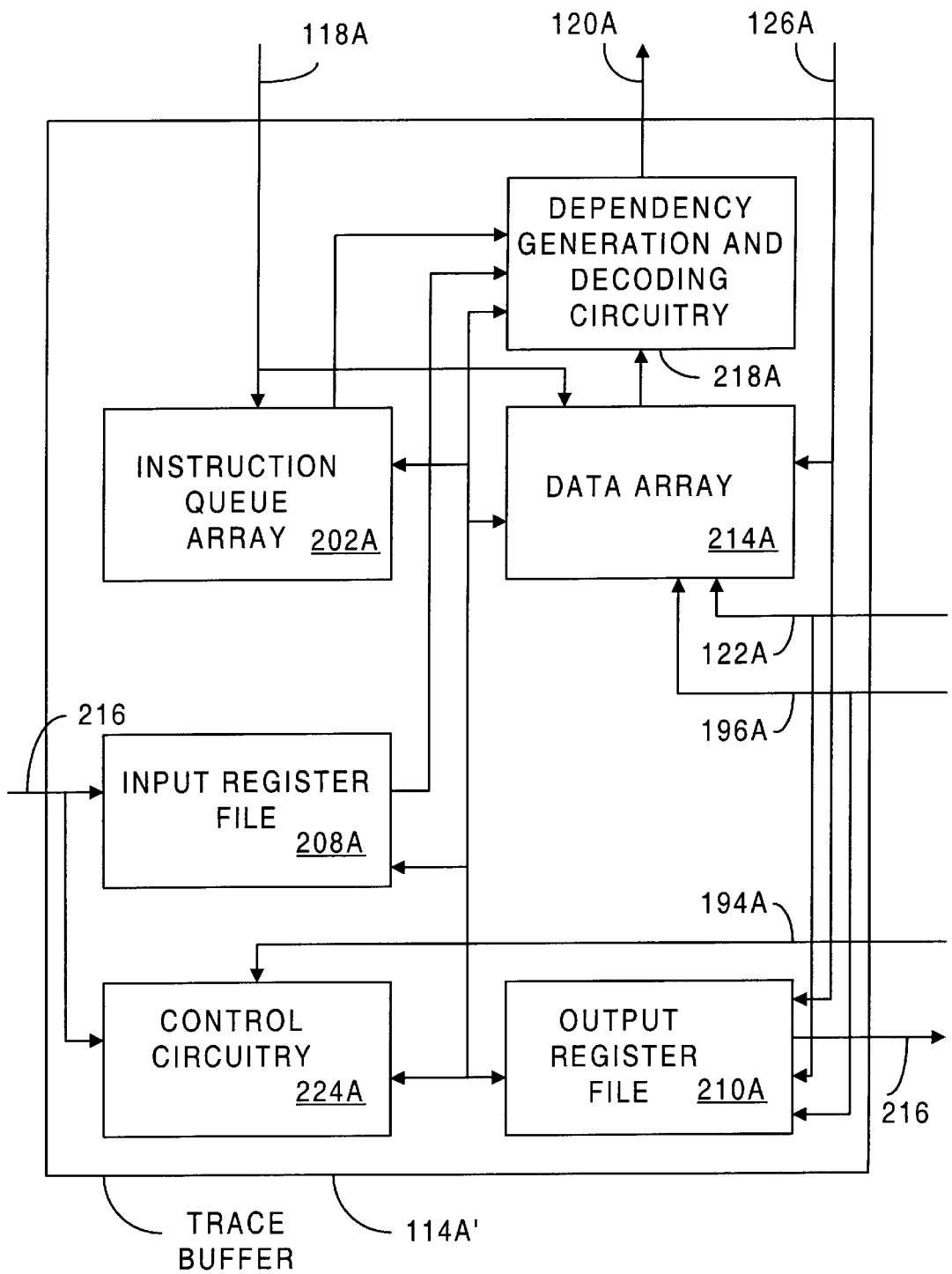
FIG. 11 is a block diagram representation of certain components in another embodiment of a trace buffer of FIG. 8.

In FIG. 10, trace buffer 114A illustrates a first embodiment of a trace buffer. In FIG. 11, trace buffer 114A' illustrates a second embodiment of a trace buffer. Other embodiments of trace buffers could include variations of trace buffer 114A and 114A' or quite different architecture.

1. Trace Buffer 114A

Referring to FIG. 10, trace buffer 114A includes an instruction queue array 202A, a data and dependency (DAD) array 206A, an input register file 208A, an output register file 210A, dependency generation circuitry 212A, and control circuitry 224A. The term "array" is intended in a broad sense to include information in multiple directions, without restriction to particular form.

a. Instruction Queue Array 202A

With reference to FIG. 12, the following describes the structure of an instruction queue array 202A and its interaction with other components according to one embodiment of the invention. Instruction queue array 202A receives instructions fetched from I-cache 104 that are part of a particular thread. The instructions within a thread are fetched and written into instruction queue array 202A in order. Instructions that are part of another thread are written into an instruction queue of a different trace buffer or into instruction queue array 202A at a different time. Instruction queue array 202A includes various fields of information for each instruction identifier (instr ID). Different embodiments could include somewhat different fields and a different numbers of rows. In the embodiment of instruction queue array 202A, the program counter value is not considered, but could be in other embodiments. Instruction queue array 202A and all other components illustrated in the drawings may include various fields, signals, and structure that is not illustrated. Such fields, signals, and structure are not illustrated because they vary depending on the implementation, are understood by those skilled in the art, and would greatly complicate this specification and tend to obscure the invention.

Instructions wait in trace buffer 114A until they are finally retired or discarded (because, for example, it is determined that the thread is not part of an in order execution of the program). If instruction queue array 202A fills up while there are still instructions in the trace that have not yet been executed, the instructions are not received by trace buffer 114 or renamne/allocate unit 150 until an instruction is finally retired from instruction queue array 202A and a row is deallocated. Entries of the various arrays in system 100 may be allocated and deallocated by movement of head and tail pointers.

Instruction queue array 202A is described in connection with the following lines of code:

I0: mul R1, R2→R1
I1: mul R3, R4→R2
I2: add R1, R2→R1
I3: add 10, R1→R4
I4: store R2→Mx
I5: store R1→My, which are the first six instructions within a thread. It will be apparent that a trace buffer other than trace buffer 114A is earlier in program order than is trace buffer 114A.

The "Op Code" field contains the operation code associated with the particular instruction. "Dest," "Source 1," and "Source 2" fields identify the destination, source 1, and source 2 of the instructions. The "Index for Source 1" field, identifies instruction entries within the trace buffer 114A that contain the source. For example, the destination of instr ID 0 is used for source 1 for instr ID 2. Therefore, a 0 is placed in the "Index for Source 1" field of instr ID 2. The destination of instr ID 2 is used for source 2 for instr ID 3. Therefore, a 2 is placed in the "Index for Source 2" field of instr ID 3. An X indicates a don't care.

The "Valid 1" and "Valid 2" field are bits that are set to a first value (e.g., a logic 0) when. a corresponding source operand of an instr ID has been previously produced by an instruction from[] outside the thread in trace buffer 114A, and a second value (e.g., a logic 1) when the source operand for an instr ID has been previously produced by an instruction within the thread. Source 1 (R1) of instr ID 0 is produced outside the trace in instruction queue array 202A. Accordingly, valid 1 of instr ID 0 is a logic 0. Source 2 for instr ID 3 is from the destination of instr ID 2. Accordingly, valid 2 of instr ID 3 is a logic 1.

Instruction I3 involves adding R1 to a constant "10." The constant may be stored with the instruction, in a special register (not shown), in the source 1 field, or through some other mechanism. In FIG. 12, an X (don't care) is shown in the Source 1 field for instr ID 3. Alternatively, some indicator could be placed in the Source 1 field.

A store buffer ID (SBID) field holds an SBID associated with a store instruction in a store buffer, described below. A load buffer (LBID) field hold an LBID entry associated with a load instruction in a load buffer, described below. The SBID and LBID values are assigned by rename/allocate unit 150 and are written to the instruction queue array through bypass conductors 126. A thread ID number field could be included in instruction queue array 202A, but it is not needed because it is implicit.

b. DAD Array 206A and Dependency Generation Circuitry 212A

Referring to FIG. 13, one embodiment of DAD array 206A includes "instr ID" entries (rows) that correspond to the instr ID entries of Instruction Queue Array 202A in a one-to-one fashion. Indeed, instruction queue array 202A and DAD array 206A could be different portions of the same array. However, in some embodiments, there are different read ports associated with instruction queue array 202A and DAD array 206A.

DAD array 206A includes a "Value or PRID" field that contains either the value produced by an instruction or the PRID in register file 152. The value is written back from the execution units to trace buffer 114A through write back unit 162 and write back buses 122 and 196. A "Status" field, which may be two bits, indicates whether the "Value or PRID" field contains a "Value" or a "PRID." In one embodiment, it is possible that the "Value or PRID" does not hold either a valid "Value" or a valid "PRID." A "Replay Count" field, which uniquely identifies an instruction dispatch, is incremented each time the instruction of the same instr ID is replayed in pipeline 108. Under one embodiment, it is possible that an instruction may be concurrently replayed more than one time within pipeline 108. In this case, under one embodiment, only the information associated with the highest "replay count" is written back to DAD array 206A.

The "Dependency Field" includes a bit for each logical register. In FIG. 13, for simplicity, only four logical registers (R1, R2, R3, and R4) are represented. However, the number could be far larger. In the example, the dependency field entries are set to 1 to indicate that a data dependency chain exists between an input value to the trace and the instruction entry, and a 0 if there is no dependency. The dependency field entries identify which instructions in the trace would need to be executed if an input value is received (such as when value misspeculation is detected).

As the instructions are fetched, decoded, and written into trace buffer 114A, the dependency bits are computed sequentially, and are written into the DAD array 206A. The dependency bits may be generated before it is determined whether to replay an instruction. The dependency bits in FIG. 13 are for the six instructions I0–I5, recited above in section B.1.a.

The dependency field can be created through a mechanical approach. Before describing one such approach, the creation will be explained on a more intuitive level.

i. Intuitive Level

The result of instruction 10 is dependent on only registers R1 and R2. Therefore, a 1 is placed in the R1 and R2 columns and a 0 remains in the R3 and R4 columns of instr ID 0 (which holds information related to instruction I0).

The result of instruction I1 is dependent on only registers R3 and R4. Therefore, a 0 is placed in the R1 and R2 columns and a 1 in the R3 and R4 columns of instr ID 1.

The result of instruction I2 is directly dependent on registers R1 and R2, produced in instructions I0 and I1, respectively. In instruction I0, R1 is dependent on the R1 and R2 values at the beginning of the trace. In instruction I2, R2 is dependent on the R3 and R4 values at the beginning of the trace. Therefore, instruction 12 is indirectly dependent on the R1–R4 values at the beginning of the trace and a 1 is placed in the R1–R4 columns of instr ID 2.

The result of instruction 13 is directly dependent on register R1 produced in instruction 12.

Therefore, instruction 13 indirectly depends on R1–R4 values at the beginning of the trace because instruction 12 depends on these values and a 1 is placed in the R1–R4 columns of instr ID 3.

The result of instruction 14 is directly dependent on register R2, which is produced in instruction I1. R2 depends on registers R3 and R4 values at the beginning of the trace. Therefore, a 0 is placed in the R1 and R2 columns and a 1 is placed in the R3 and R4 columns of instr ID 4.

The result of instruction 15 is directly dependent register R1, which is produced in instruction 12, which depends on registers R1–R4 at the beginning of the trace. Therefore, a 1 is placed in the R1–R4 columns of instr ID 5.

ii. A Mechanical Approach

Figures 14, 15:
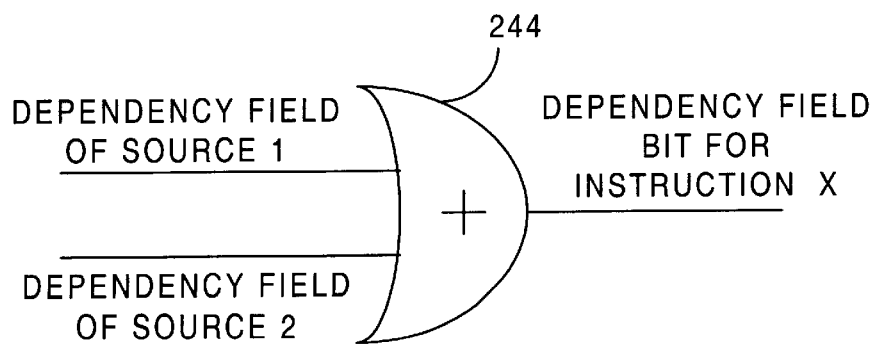
FIG. 14 illustrates one embodiment of modifier registers and a modified register used in creating the dependency field of the array of FIG. 10.
FIG. 15 is a logical OR gate used in creating the dependency field of the array of FIG. 13.

The following are registers and an algorithm that may be used to generate the dependency field according to one embodiment of the invention. Referring to FIG. 14, dependency generation circuitry 212A contains temporary registers 230, 232, 234, and 236, one for each logical register, plus an additional temporary register 240. Temporary registers 230, 232, 234, and 236 contain modifiers for logical registers R1, R2, R3, and R4. Modified registers 240 contains a set of bits which indicate which logical registers are to be modified by instructions within a trace. Registers 230, 232, 234, 236, and 240 are updated every time a new instruction is written into the trace buffer. The boundaries between registers is somewhat arbitrary. For example, they may all be in one combined register.

For each logical register, a trace buffer address register is provided, which points to the last instruction in trace buffer 114A to modify the logical register. The modified bits, and the last modifiers addresses are used to compute the dependency bits for the next instruction to be written into trace buffer 114A.

Note that as used herein, modifying a register merely means a value is written into the register. It does not necessary mean that the contents of the register are different as a result of the instruction. For example, if the contents of R1 and R2 are multiplied (as they are in instruction I0) and the result is written into register R1, the contents of R1 is not necessarily different as a result of instruction 10. For example, the contents of R1 after the instruction would not be different if the contents of R1 is "0" or R2 is "1" before the instruction.

Figure 16:
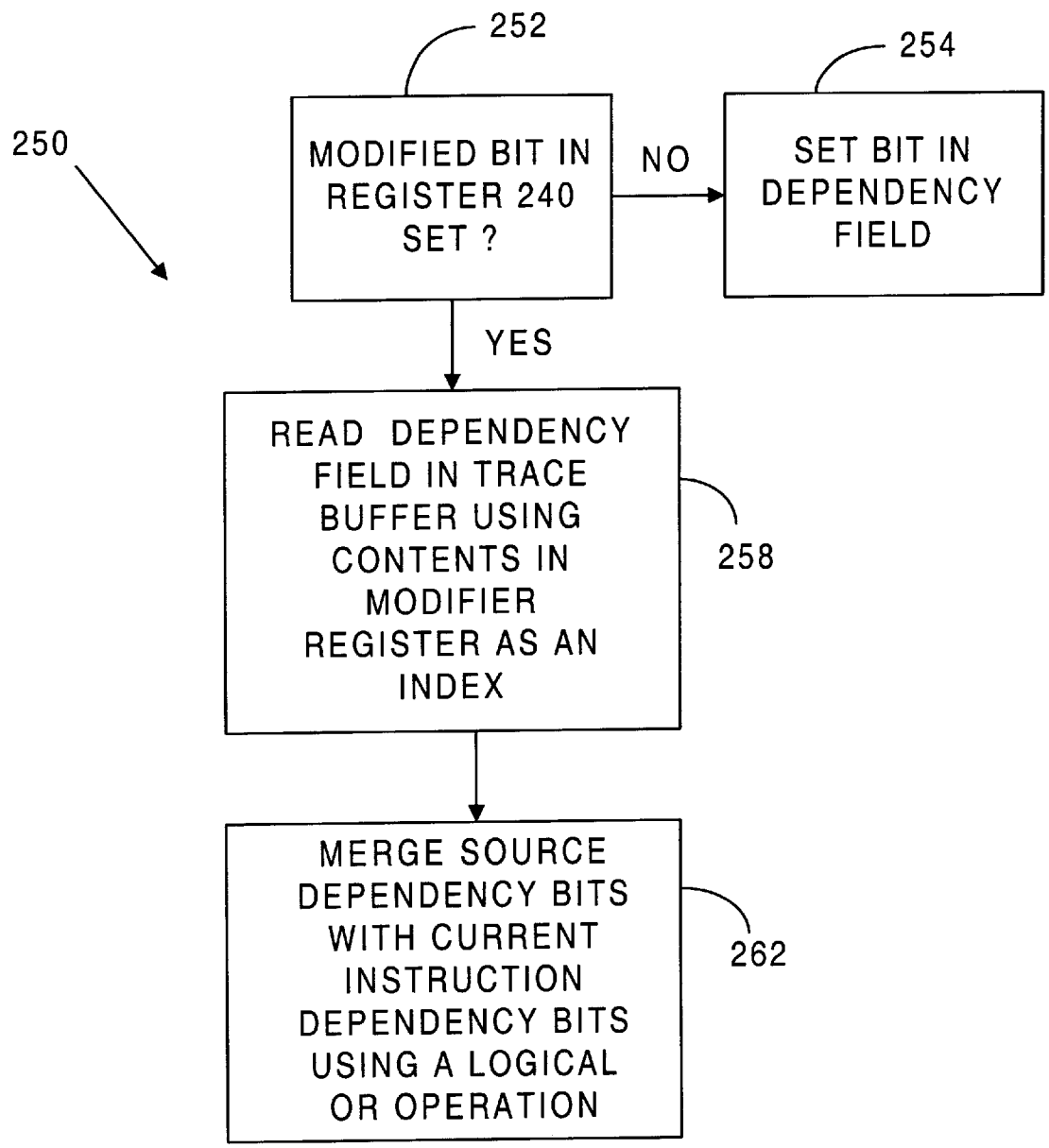
FIG. 16 is a flow chart illustrating one embodiment of operations used to create the dependency field of the array of FIG. 13.

In FIG. 16, a flow chart 250 represents an algorithm which is performed for each source operand of an instruction (e.g., source 1 and source 2) to create the dependency field of DAD array 206A. In step 252 it is determined whether the associated bit is set in register 240. As described in step 254, if the bit in register 240 is not set, then the bit in the dependency field associated with the register is set to a logical 1. As stated in step 258, if the bit in register 240 is set, the source dependency field is read using the index created from the modifier register (230, 232, 234, or 236) for the relevant register. Next, as stated in step 262, the source dependency bits are merged with the current instruction dependency bits using a logical OR operation. Such a logical OR operation is illustrated by OR-gate 244 in FIG. 15 (in which multiple bits are represented at the inputs). In performing the algorithm of FIG. 16, the modified registers and modifiers referred to are those that existed immediately before an instruction is performed. With respect to I0, prior to instruction I0, register 240 has logical 0s for R1, R2, R3, and R4, and the values of registers 230, 232, 234, and 236 are X (don't care). Under step 252, the modified bits in register 240 for R1 and R2 are each 0. Therefore, under step 254, the dependency field bits for R1 and R2 are each set to 1 in row instr ID 0 of DAD array 206A. Registers R3 and R4 are not involved and remain a 0 in the row of instr ID 0. Instruction I0 modifies register R1. Therefore, a 0 is placed in register 230, indicating that instruction I0 is the most recent instruction to modify register R1. The values in registers 232, 234, and 236 remain X (don't care). The R1 bit of register 240 is set to a 1 indicating that R1 has been modified by an instruction within the trace.

The dependency field for instruction I1 is generated in a similar manner to that of instruction I0. The R1 logical register column of modified register 240 remains set to a 1. A logical 1 is place d in the R2 column of modified register 240. The 1 in register 232 represents instruction I1.

With respect to instruction I2, prior to instruction I2, under step 252, the modified bits in register 240 for R1 and R2 are each a logical 1 (i.e., set). Under step 258, the modifier registers for R1 (230) and R2 (232), immediately prior to instruction I2, are used as an index. Register 230 contains a 0 for instruction I0. The dependency field for instruction I0 in instr ID 0 of DAD array 206A is 0011. Register 232 contains a 1 for instruction I1. The dependency field for instruction I1 in instr ID 1 is 1100. Under step 262, the logical OR of 0011 and 1100 is 1111. Therefore, 1111 is placed in the dependency field of DAD array 206A for instr ID 2. R1 is modified by instruction I2. However, a 1 is already in register 240 for register R1. A 2 is placed in register 230, indicating that instruction I2 is the most recent instruction to modify instruction R1.

The dependency field for instruction I3 is generated in a similar manner to that of instruction I2. A logical 1 is added to the R4 column of modified register 240 and a 3 representing instruction I3 is placed in register 236. The logical OR produces 1111.

With respect to instruction I4, prior to instruction I4, under step 252, the modified bit in register 240 for R2 is set to a 1. Under step 258, the modifier register for R2 (232), immediately prior to instruction I4, is used as an index. Register 232 contains a 1 for instruction I1. The dependency field for instruction I1 in instr ID 1 of DAD array 206A is 1100. Under step 262, the logical OR of 1100 (source 1 from instr ID 1) and 0000 (there is no source 2) is 1100. Therefore, 1100 is placed in the dependency field of DAD array 206A for row instr ID 4.

The dependency field of instruction I5 is generated in a manner similar to that of instruction I4. Instructions I5 and I6 modify an external memory location and do not cause a change in registers 230, 232, 234, 236, or 240.

The dependency information may be used by schedule/issue unit 156, or schedule/issue until 156 may merely derive its own dependency information.

Figure 17:
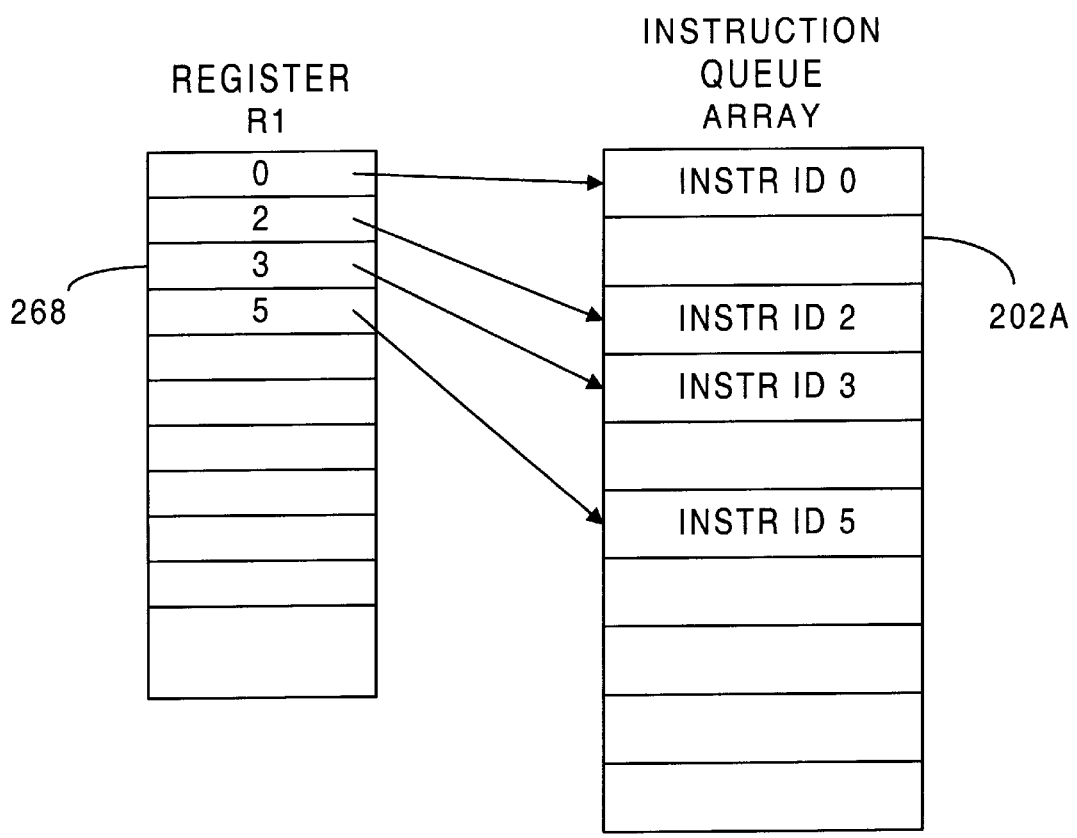
FIG. 17 is a graphical representation of a particular register and locations in a trace buffer that has dependencies thereon according to one embodiment of the invention.

There are different ways in which a sequence or string of instructions can be issued out of trace buffer 114A in replay. One way is to sequentially read the trace buffer and extract those instructions that have the dependency bits set and send them for replay. However, zeros may have the effect of creating bubbles in the pipeline. Another approach is to have bubbles removed by packing logic before sending instructions for execution/replay. Referring to FIG. 17, another approach involves some additional hardware including an array 268 for each logical register. Array 268 includes instr ID values of instructions that are dependent on register R1. The values in array 268 act as pointers to the entire instr ID entries in instruction queue array 202A. This allows very fast reading from the instruction buffer. A block of instructions (perhaps 2 or 4) are read at a time. Trace buffer 114A could be multi-ported and have four decoders and pass each one of these indices that were obtained from the register array into the decoders and instructions I0, I2, I3, and I5 can be read in one cycle. The register R1 array could be assembled at the time the dependency field is created, before replay begins. The level of indirection facilitates high bandwidth replay.

C. Output Register File 210A and Input Register File 208A

Trace buffers 114 include detection circuitry to detect certain speculation errors. According to one embodiment of the invention, each trace buffer has an output register file that holds the register context of the associated thread and an input register file to receive the register context of the immediately preceding thread in program order. The register context is the contents or state of the logical registers. The contents of the output register file is updated often, perhaps each time there is a change in a register. The contents of the input register file is updated only after a comparison, described below.

Figure 18:
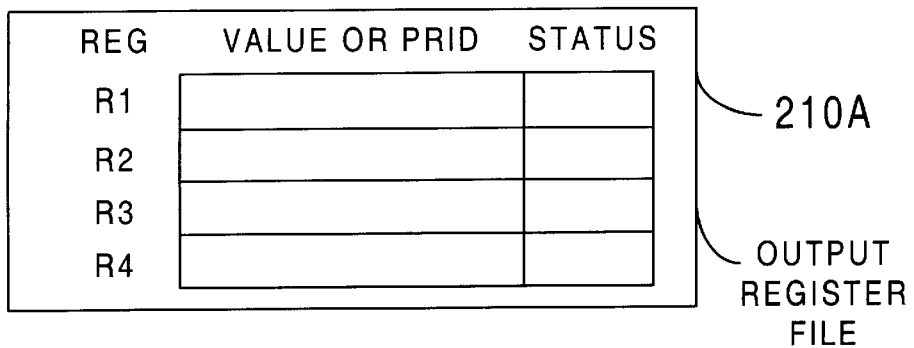
FIG. 18 is a graphical representation of portions of one embodiment of an output register file of the trace buffer of FIG. 10.
Figure 19:
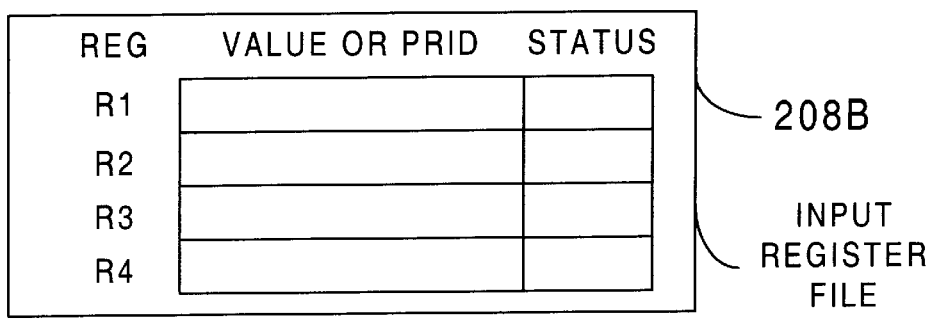
FIG. 19 is a graphical representation of portions of one embodiment of an input register file of the trace buffer of FIG. 10.

FIGS. 18 and 19 illustrate embodiments of an output register file 208A (in trace buffer 114A) and an input register file 208B (in trace buffer 114B), although other embodiments could be used. Output register file 208A and input register file 210B include a Value or PRID field and a, status field. The status field indicates whether a valid value or a valid PRID is held in the Value or PRID field. In one embodiment, there is either a valid value or a valid PRID. In another embodiment, there could be neither, in which case an instruction that depends on an input register file could wait for one.

Note that instruction I0 in the example described above involved registers R1 and R2, neither of which were previously the destination of an instruction within the thread that includes instruction I0. However, the value or PRID for registers R1 and R2 would be available from input register file 208A to be used in execution of instruction I0.

Figure 20:
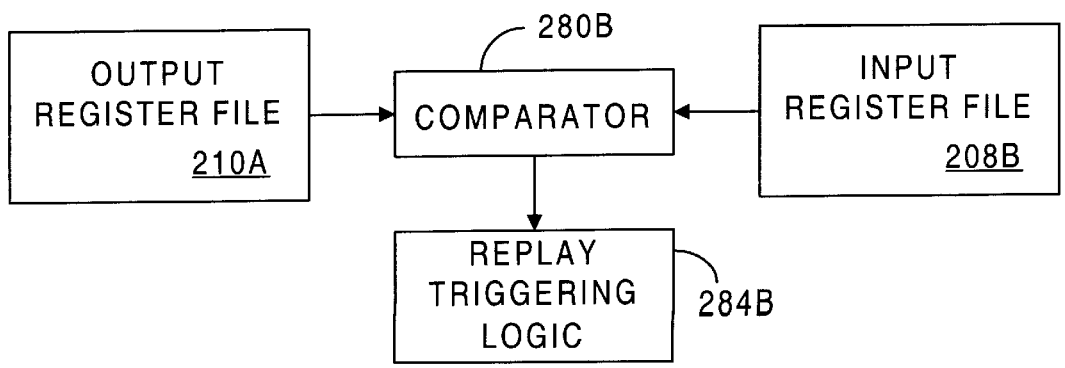
FIG. 20 is a block diagram of a comparator and replay triggering logic used in connection with the output register file of FIG. 18 and the input register file of FIG. 19 according to one embodiment of the invention.

Referring to FIG. 20, a comparator 280B compares the contents of input register file 208B (in trace buffer 114B) for a current thread with the contents of output register file 210A (in trace buffer 114A) for an immediately preceding thread in program order. The comparison can be made at the end of the execution of the immediately preceding thread or during the original execution of the preceding thread. The comparison is also made at the end of the retirement of the preceding thread. In one embodiment, the comparison is only made at the end of the retirement of the preceding thread.

Various events could trigger a comparison by comparator 280B. The comparison is made to detect speculation errors. If there is a difference between the input and output register files, then values of one or more of the output registers of the immediately preceding thread had changed. In response, input register file 208B is updated and replay triggering logic 284B causes the effected instructions to be replayed with the changed register values. The dependency field may be used by replay triggering logic 284B. There is no guarantee that the changed values are the ultimately correct values (i.e., the register values that would have been produced in a purely in order processor). The instructions may need to be replayed again, perhaps several times.

In one embodiment, the detection circuitry for a thread includes an output register file, an input register file, a comparator and associated control circuitry to detect certain speculation errors in instructions held in the trace buffer that includes the input register file. In other embodiments, the detection circuitry could include somewhat different circuitry.

Figure 21:
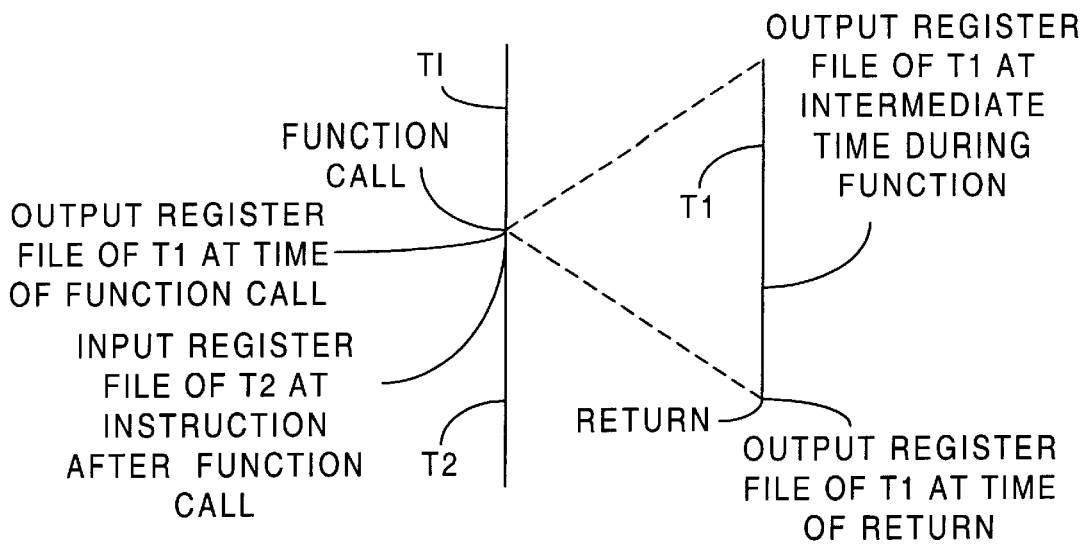
FIG. 21 is a flow diagram illustrating points at which the contents of the output register file may be utilized.

As an example, referring to FIG. 21, thread T2 is a current thread and is associated with trace buffer 114B. Thread T1 is the immediately preceding thread to thread T2 and is associated with trace buffer 114A. Thread T1 includes a function call, the function, and a return from the function call. Execution of thread T2 begins immediately after the function call. The contents of output register 210A as it existed at the function call are copied into input register file 208B. The instructions of thread T2 are executed speculatively based on the register context in input register file 208B. At the time of the return instruction, the contents of input register file 208B are compared by comparator 280B with the contents of output register file 210A. If there is a difference, input register file 208B is updated and the effected instructions in thread T2 are replayed. The comparison may also be made at one or more intermediate times. This may help prevent bottlenecks by more evenly distributing replay of instructions, but may cause additional replays if, for example, the output register file contents changes more than once during the function. In that the output register file is constantly changing, it may be desirable to have an intermediate buffer that receives the contents of output register file 210A. The comparison then may be between the contents of intermediate buffer and input register file 208B.

As illustrated in FIG. 8 and 10, register contexts are passed between output register files and input register files over conductors 216. Conductors 216 connect each input register file with the output register file of each trace buffer that could hold the trace for the immediately preceding thread. If it can be guaranteed that program order will always follow particular trace buffer order, then the layout for conductors 216 could be fairly simple. The output and input register files may be controlled by control circuitry 224A shown in FIGS. 10 and 11.

Because output and input register files will provide either a value or a PRID, there may be a very small latency between receiving contents in an input register file and being able to execute instructions using a register from the input register file as a source operand. If a value is not available, the PRID to register file 152 may be used for execution in pipeline 108.

It is expected that many instructions will be replayed several times as correct source operands work their way through the register files of the various threads. However, it is also expected that for many programs, a great deal of instructions will need to be replayed either not at all or a relatively small number of times, leading to a substantial increase in instructions correctly executed per unit of time, and a decrease in the total time required to run a program.

2. Trace Buffer 114'

Referring to FIG. 11, trace buffer 114A' is similar to trace buffer 114 (in FIG. 10). However, in trace buffer 114A' the dependency field is generated in dependency generation and decoding circuitry 218A after it has been decided that an instruction is to be replayed. While this may cause some initial latency in replay, if the issuance of instructions for replay and determining of dependencies is performed in a pipelined fashion, there may be little additional latency once the process has begun.

In one embodiment, dependency generation and decoding circuitry 218A holds only one field for dependency information. (In FIG. 13, there are four fields.) That same field could be reused. For example, during replay of instructions dependent on register R1, the field could be used to list instructions dependent on register R1. During replay of instructions dependent on register R2, the same field could be used to list instructions dependent on register R2, etc. Dependency generation and decoding circuitry 218A could include only one modifier field and one modifier register. (In FIG. 14, there are four.) Alternatively, dependency generation and decoding circuitry 218A could include multiple dependency fields and registers. Dependency generation and decoding circuitry 218A may determine dependencies for only a few instructions at a time.

Data array 214A includes a Value or PRID field, a Status bit field, and replay count field for each instr ID entry (as in DAD array 206A of FIGS. 10 and 13). Alternatively, the contents of data array 214A could be put in dependency generation and decoding circuitry 218A making data array 214A unnecessary. There are two reasons why it may be advantageous to keep data array 214A and dependency generation and decoding circuitry 218A separate. First, they may involve different read ports. Second, in one embodiment, dependency generation and decoding circuitry 218A does not have as many rows as do instruction queue array 202A and data array 214A. In other words, in one embodiment, dependency generation and decoding circuitry 218A reuses rows, just like it may reuse dependency fields. There are, of course, many possibilities.

As will be described in greater detail below, MOB 178 signals when load instructions are to be replayed through conductors 194. An array having a dependency field (like that for R1 in FIG. 13) may be generated to list the instructions dependent on the load instruction to be replayed. However, for a load instruction, the list of dependent instructions begins with the load instruction, rather than with the first instruction in the trace as in the case of registers. The dependency field for load instructions may be in dependency generation and decoding circuitry 218A (in FIG. 11). (Of course, load instructions for other traces would be replayed from other trace buffers.) In one embodiment, dependency generation and decoding circuitry 218A is used for dependency fields for both load instructions and registers. The same field can be used for both. In another embodiment, the dependency fields for registers is in DAD array 206A and the dependency field for loads is in dependency generation and decoding circuitry 218A.

In still another embodiment, the load instruction is replayed in full (i.e., all instructions following the load are re-executed) so that the dependency field is not needed.

C. A Replay Sequence Algorithm

When replay triggering logic (such as replay triggering logic 284B) determines that a source operand (or other input value) has been mispredicted, it triggers the corresponding trace buffer (such as trace buffer 114B) to dispatch those instructions that are directly or indirectly dependent on the mispredicted source operand to be replayed in pipeline 108. The instructions that are directly or indirectly dependent may be identified from the dependency field of the DAD array in the trace buffer or through another array as in FIG. 11.

The identified instructions are dispatched from the trace buffer for execution in the order the instructions exist in the trace buffer (which is the program order). For example, the instruction in instr ID0 entry is dispatched at prior to or at the same time as an instruction in the instr ID1 entry. However, the instructions may be executed out of order under the control of schedule/issue unit 156, as in any out-of-order processor. Control bits are appended to the instruction dispatched from the trace buffer to indicate to rename/allocate unit 150 whether to (1) do register renaming, (2) bypass the rename alias table lookup in rename/allocate unit 150 and instead use the PRID from the corresponding trace buffer, or (3) bypass renaming completely and use the value from the DAD array as if it where a constant operand in the instruction.

As explained in connection with FIG. 12, the "Valid 1" and "Valid 2" field are bits that are set to a first value (e.g., a logic 0) when a corresponding source operand of an instr ID has been produced by (e.g., the destination of) an instruction from outside the thread in trace buffer 114A, and a second value (e.g., a logic 1) when the source operand for an instr ID has been produced by an instruction within the thread. A replayed instruction dispatched from trace buffer 114A may have its source operands determined as follows:

(1) Valid bit 1. If the valid bit in instruction queue array 202A is set to a logical 1, the index for the source operand is used to read the corresponding value or PRID in DAD array 206A. If neither the value bit nor PRID bit of the DAD array status field is valid, it means the source operand register has not been renamed yet. In this case, the instruction is dispatched with the value and PRID status bits having logical zero values through conductor 120 and MUX 110, allowing rename/allocate unit 150 to perform alias table lookup (register renaming) as it normally does. If the PRID or value is valid, it is passed along with the instruction through conductor 120 and MUX 110 to rename/allocate unit 150, which in response thereto bypasses the renaming stage.

(2) Valid bit 0. If the valid bit for a source operand is set to a logical 0, the input operand comes from outside the trace. The source register name is used to access input register file 208A. The value or PRID from input register file 208A is passed along with the instruction to rename/allocate unit 150, which in response thereto bypasses the renaming stage.

Whether the valid bit is 0 or 1, for each dispatched instruction, the value and PRID status field bits in DAD array 206A are reset to or remain at a logical 0. This achieves two purposes. First, it ensures that a later dependent instruction dispatched before the PRID is copied into the entry from the rename stage would be allowed to be renamed from the rename alias table, avoiding the use of a stale PRID from trace buffer 114A. Second, it also ensures that an instruction will not retire until the last execution instance is written back, therefore allowing an instruction to retire only when all data mispredictions have been corrected.

D. Second Level or Final Retirement

An instruction is finally retired from trace buffer 114 when all the instructions for all previous threads have retired and all replay events that belong to the instruction have been serviced. Stated another way, an instruction is finally retired when it can be assured that the instruction has been executed with the correct source operands. Threads are retired in order. For example, an instruction in thread X cannot be retired until all the previous threads have been retired (i.e., the instructions of all the previous threads have been retired). The instructions within a thread are retired in order, although instructions that are all ready for retirement may be retired simultaneously.

Final retirement is controlled by final retirement logic 134. In one embodiment of the invention, final retirement includes (1) commitment of results to in order register file, (2) service interrupts, exceptions, and/or branch mispredictions; (3) deallocation of trace buffer and MOB 178 resource entries; and (4) signaling the MOB to mark stores as retired and to issue them to memory. Deallocating entries may involve moving a head pointer. As described below, store instructions in MOB 178 are not deallocated until after it is certain that associated data is copied to data cache 176 or other memory. Details regarding final retirement of loads and stores instructions in MOB 178 are described below.

E. Memory System

Figure 22:
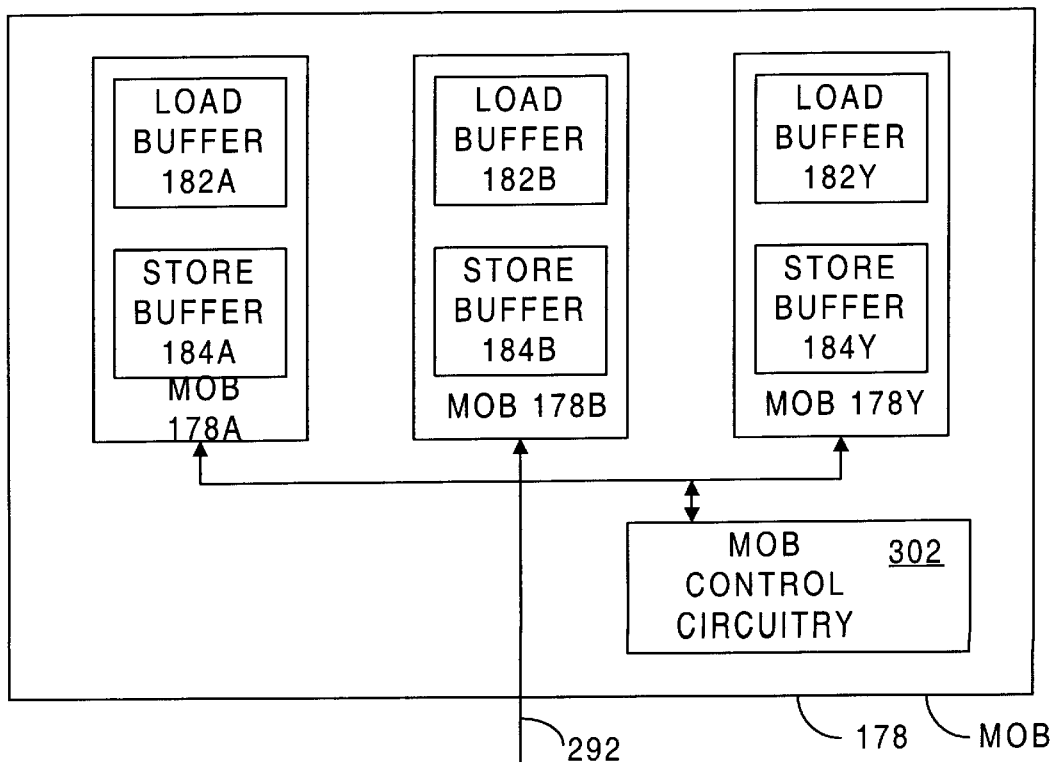
FIG. 22 is a block diagram illustrating individual memory order buffers (MOBs) within the MOB of FIG. 2 according to one embodiment of the invention.

FIG. 22 illustrates that one embodiment of MOB 178 of FIG. 2 includes MOBs 178A, 178B, . . . , 178Y, where Y represents the number of MOBs and matches the number of trace buffers 114. MOBs 178A, 178B, . . . , 178Y hold copies of load and store instructions of the traces in trace buffers 114A, 114B, . . . , 114Y, respectively. Load instructions are held in load buffers 182A, 182B, . . . , 182Y. Store instructions are held in store buffers 184A, 184B, . . . , 184Y. Conductors 292 represent various conductors that carry signals to and from MOB 178. Replay conductors 194 provide signals from MOB 178 to trace buffers 114 alerting trace buffers 114 that a load instruction should be replayed. Control circuitry 302 performs a variety of control functions.

1. Store Buffers and Load Buffers

FIG. 23 illustrates one embodiment of a store buffer 184A, which is representative of store buffers 184B, . . . , 184Y. Various other embodiments could be used. Store buffer 184A includes various fields for rows of store buffer entries. Each entry is identified by a store buffer ID (SBID). Rename/allocate unit 150 allocates an SBID entry to each store instruction when it is first fetched and executed, but not on replay. The store instruction has the same SBID value until final retirement. For example, in FIG. 23, entry SBID 0 is allocated for instruction store 0. Entry SBID 1 is allocated for instruction store 1, etc. An LBID field holding a "store LBID" value described below, is illustrated in FIG. 23. In one embodiment, when an entry of instruction queue array 202A (in FIG. 12) holds a store instruction, the SBID field of instruction queue array 202A holds the SBID that identifies the entry in store buffer 184A that holds the store instruction, and the LBID field holds the store LBID, if there is one, for that the store instruction. The SBID and store LBID accompany the store instruction through pipeline 108. In that embodiment, the LBID field might not be also included in store buffer 184A.

An instr ID field holds the instruction ID of the store instruction in instruction queue array 202A. The thread buffer ID is implicit in both store buffer 184A and the trace buffer 114A. An op code field holds the op code of the store instruction. A store address field holds the address to which the store instruction is directed. In the illustrated embodiment, the address is generated by AGU 172. An SB address valid field includes a bit indicating whether the store address is a valid address. A data field holds the data to be stored. A data valid field includes a bit indicating whether the data is valid. Separate address and data valid bits may be used because the valid address may arrive at a different time than the valid data. Both the address and data arrive before the store instruction is executed. Under one embodiment, the data is included as part of the instruction. A retired field includes a bit that is set when final retirement logic 134 indicates the store instruction should retire and is reset when confirmation is received from memory that the store to memory has been complete. Retirement of loads and stores is discussed below. A replay count field includes a replay count number (and is similar to the replay count field of DAD array 206A in FIG. 13). The replay count field is not necessary. Under one embodiment, a store instruction can be replayed only once at a time and there is no replay count field.

FIG. 24 illustrates one embodiment of a load buffer 182A, which is representative of load buffers 182B, . . . , 182Y. Various other embodiments could be used. Load buffer 182A includes various fields for rows of load buffer entries. Each entry is identified by a load buffer ID (LBID). Rename/allocate unit 150 allocates an LBID entry to each load instruction when it is first fetched and executed, but not on replay. The load instruction has the same LBID value until final retirement. For example, in FIG. 24, entry LBID 0 is allocated for instruction load 0. Entry LBID 1 is allocated for instruction load 1, etc. (The LBID entry number and the SBID field may be called a MOB ID). An SBID field holding a "load SBID" value described below, is illustrated in FIG. 24. In one embodiment, when an entry of instruction queue array 202A (in FIG. 12) holds a load instruction, the LBID field of instruction queue array 202A holds the LBID that identifies the entry in load buffer 182A that holds the load instruction, and the SBID field holds the load SBID, if there is is one, for that store instruction. The LBID and load SBID accompany the load instruction through pipeline 108. In that embodiment, the SBID field might not be also included in load buffer 182A.

An instr ID field holds the instruction ID of the load instruction in instruction queue array 202A. The thread buffer ID is implicit in both load buffer 182A and the trace buffer 114A. An op code field holds the op code of the load instruction. A load address field holds the address from which the load instruction loads. An entry valid field includes a bit indicating the entry is occupied by a valid load instruction. In the illustrated embodiment, an address valid field is not included because the address has already been generated by AGU 172. A PRID field holds a PRID from rename/allocate unit 152 which indicates the destination of load instructions in the register file 152. SB Hit, SBID, Thread ID, and replay count field (if there is one) may be considered part of a status field and are described below in connection with execution of store instructions.

At the time store and load instructions are first received by rename/allocate unit 150, entries for store and load instructions are allocated in store buffers 184 and load buffers 182, and entries for registers to receive loaded values are allocated in register file 150 and ROB 164. These store and load entries are not subject to a first level retirement, but like entries in trace buffers 114, remain allocated until a final retirement. Accordingly, entries are not reallocated on replay. If a store or load buffer is full, at store or load instruction, respectively, from I-cache 104 will not pass through rename/allocate unit 150 until an entry is freed up. However, a load or store instruction that is being re-executed from a trace buffer will pass through rename/allocate unit 150.

2. Comparisons of Load and Store Addresses

Referring to FIG. 5, in program order, store MX in thread T1 is executed before load MX is executed in thread T2. However, because of concurrent execution, in time order, store MX may be executed before or after load MX. If store MX is executed before load MX in time order, then the speculative execution of load MX will be in the correct order with respect to store MX. If all instructions before store MX in program order have been retired, then it is certain that load MX will load the correct value from memory location MX. The correct value is the value that would have been loaded if the threads were run by an in order processor. If not all instructions before store MX in program order have been retired, then there is always a chance that the data for store MX is incorrect.

By contrast, if store MX is executed after load MX in time order, then the speculative execution of load MX will not be in the correct order with respect to store MX and there is no certainty load MX will load the correct value. It would only be by coincidence that the correct value happened to be in memory location MX (or the data field of the store buffer entry holding store MX until store MX is finally retired). To ensure ultimate correctness of execution, MOB 178 includes various mechanisms to ensure memory data coherency between threads.

a. Execution of Load Instructions

Before a load instruction is executed, its address is compared with the addresses of store instructions to determine which, if any, store instruction is the closest earlier matching store instruction (CEMSI). "Matching" means having the same address as the load instruction. "Earlier" means the CEMSI is earlier in program order than the load instruction. "Closest" means there is no other matching store instruction between the CEMSI and the load instruction to be executed. If there is only one earlier matching store instruction, it is the CEMSI.

If there is a CEMSI, the load instruction reads its data from the data field of the CEMSI. If there is no CEMSI, the load instruction takes its data from memory, such as data cache 176, an L2 cache, or main memory. Data from a store buffer 184 or memory is passed through MUX 192 and written to the entry in trace buffers 114 designated by the thread ID and instr ID. The data may also be written to the register in register file 152 designated by the PRID. The data may also be stored in data cache 176 depending on the caching rules (e.g., write back, write through, etc.). MUX 192 is a bypass because it can bypass memory, such as data cache 176, an L2 cache, or main memory.

Figure 25:
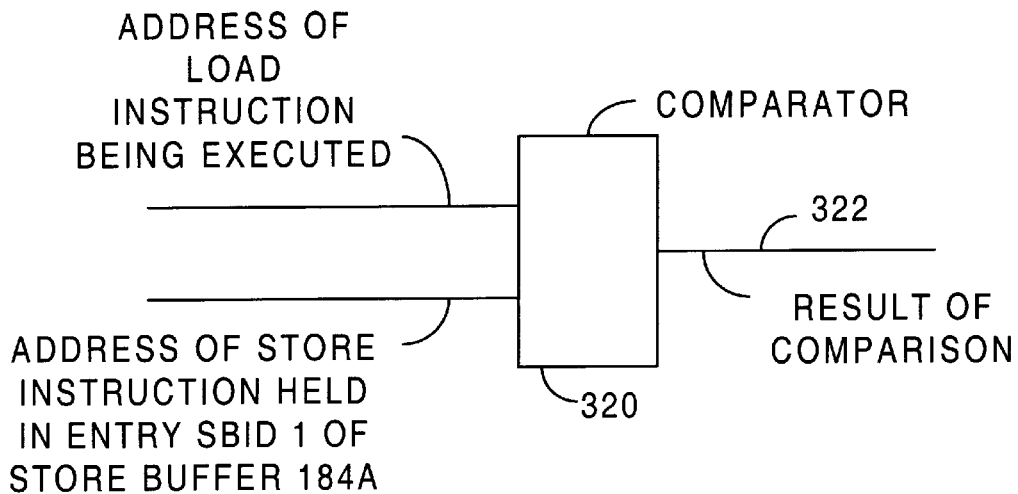
FIG. 25 illustrates a comparator comparing addresses of load and store instructions.

In one embodiment, a different comparator is associated with each entry of each of store buffers 184 to make comparisons between the address of the load to be executed and the address of store instructions. Comparator 320 in FIG. 25 is an example and receives the load instruction address and the store address of entry SBID 1 in store buffer 184A. Conductor 322 as well as output conductors from other comparators are connected to MOB control circuitry 302.

The load SBID points to the SBID of a closest earlier store instruction (CESI) with respect to the load instruction to be executed. The CESI is in the store buffer that has the same thread ID as the load instruction. If there is a CEMSI, it is either the CESI or earlier than the CESI in program order. Rename/allocate unit 150 keeps track of the order of store and load instructions in the program and provides the SBID and the LBID values. They may be written through conductors 126 to trace buffers 114. Under one embodiment, if there is no CESI with respect to a load instruction, then there is no load SBID associated with that instruction. This happens when the first memory instruction in a trace is a load. Various techniques may be used to handle this situation including rename/allocate unit 150 sending certain signals to indicate there is no valid load SBID. The array wrap around bit, described below, may be used for this purpose.

Consider store and load instructions in the following program order:

store 0
store 1
load 0
store 2
load 1
store 3
store 4
load 2.

The store LBID values in the LBID field are illustrated in store buffer 184A. The load SBID values in the SBID field are illustrated in load buffer 182A. For example, the 2 in the SBID field of LBID entry 1 indicates that the store instruction at entry SBID 2 in store buffer 184A holds the CESI with respect to the load instruction in LBID entry 1. Instructions store 0, store 1, store 2, and load 0 are older or earlier than load 1. Instructions store 3, store 4, and load 2 are younger or later than load 1.

There are various ways in which control circuitry 302 may determine which if any store instruction is the CEMSI. Examples of the ways are discussed in connection with FIG. 27, wherein store buffers 184A, 184B, 184C, and 184D are the only store buffers in MOB 178 and are associated with threads A, B, C, and D, respectively. Assume that the program order is thread A, then thread B, then thread C, then thread D. In the example, the load instruction to be executed is in load buffer 182C. There is a CESI, which is in store buffer 184C.

Conductors 342, 344, 346, and 348 are the output conductors of the various comparators. Conductors 362, 364, 366, and 368 provide control signals that enable the comparators to perform the comparisons. In different embodiments, control circuitry 302 enables (1) the comparators for all entries in each store buffer, (2) only those comparators that are in a store buffer having a thread ID that is the same as or earlier in program order than the load instruction's thread ID, or (3) only those comparators associated with entries that are earlier in program order than the load instruction.

Figure 27:
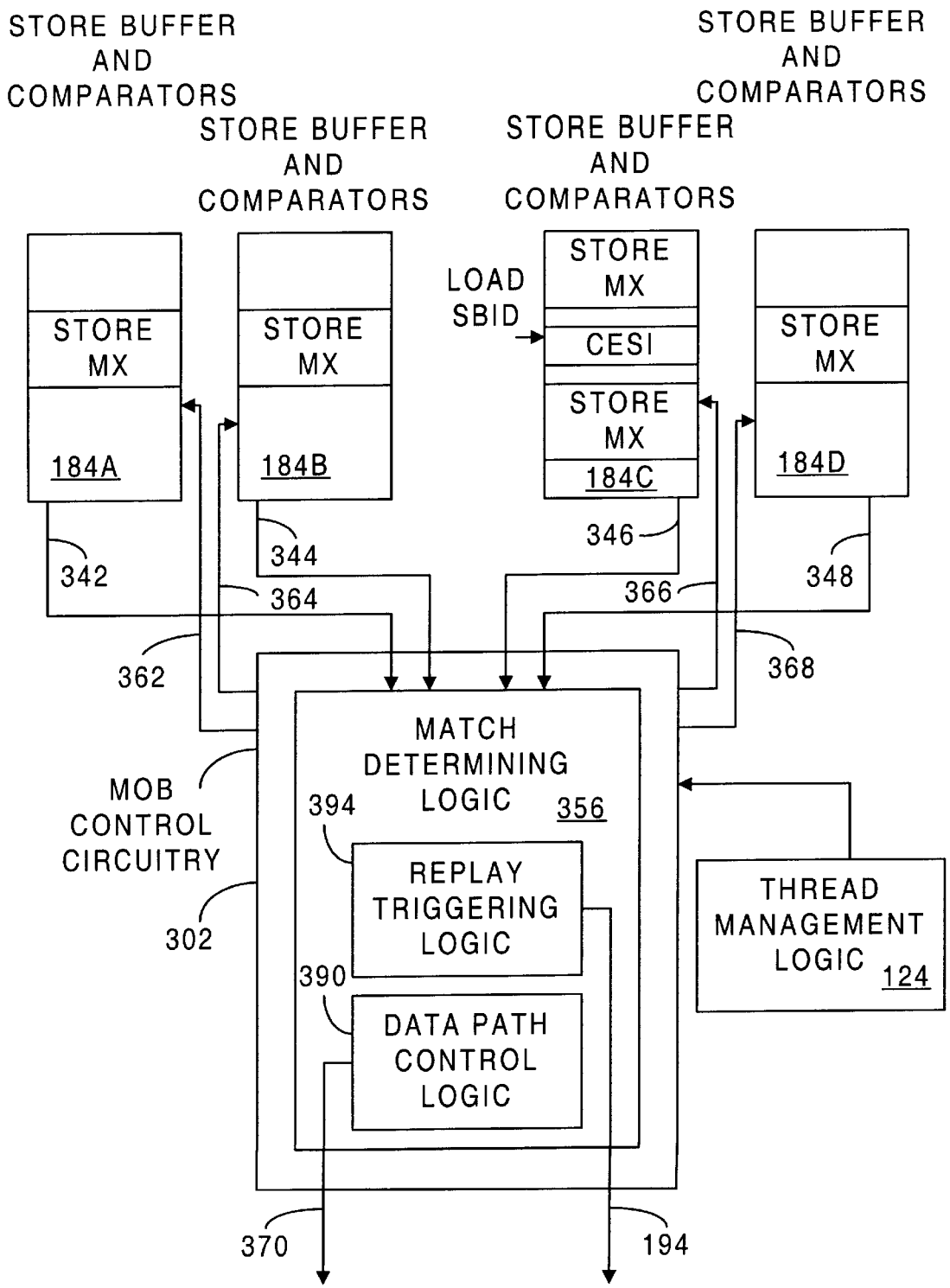
FIG. 27 is a block diagram representation of MOB control circuitry and store buffers according to one embodiment of the invention.

Match determining logic 356 determines which, if any, of the store instructions is the CEMSI. In FIG. 27, the store Mx instruction in the upper portion of store buffer 184C is the CEMSI. If that store MX instruction were not in store buffer 184C, then the CEMSI would be the store MX instruction in store buffer 184B. While comparators and match determining logic 356 are determining whether there is a CEMSI, a lookup may be occurring in data cache 176 (and other memory) to be ready if there is no CEMSI. Match determining logic 356 includes data path control logic 390, which provides a signal on conductor 370 to control whether MUX 192 passes data from memory or a store buffer.

Under one approach, there are two priority determinations made by MOB control circuitry 302. One may be to determine the priority of store instructions within store buffers. Another may be to determine the priority of the store buffers. The determinations may be in either order. A carry chain structure may be used in the determination of the priority within the store buffer. For example, in one embodiment, for each store buffer other than the one having the same thread ID as the load instruction, it is determined which, if any, matching store instruction is the youngest in program order. For the store buffer having the same thread ID as the load instruction, it is determined which, if any, matching instruction is the closest in program order to (including equal to) the CESI. Then, it is determined which of those store buffers that have a matching instruction have a thread ID that is closest in program order to the thread ID of the load instruction.

Store buffers 184 may be circular arrays each having a head and a tail. Initially, store instructions with the greater SBID value are younger. However, as store entries are deallocated and allocated, the tail will eventually wrap around so that the head points to a higher SBID entry than does the tail. In one embodiment, a wrap around bit is toggled when the tail goes from the highest to the lowest SBID value, and is provided to closest match determining logic 356.

b. Execution of Store Instructions

When a store instruction is executed, its address is compared with the addresses of load instructions to determine which, if any, load instructions that are later in program order (from the same or a younger thread) have the same address as the store instruction. A closest later load instruction (CLLI) pointed to by the store SBID designates the earliest load instruction that may be considered.

Figure 26:
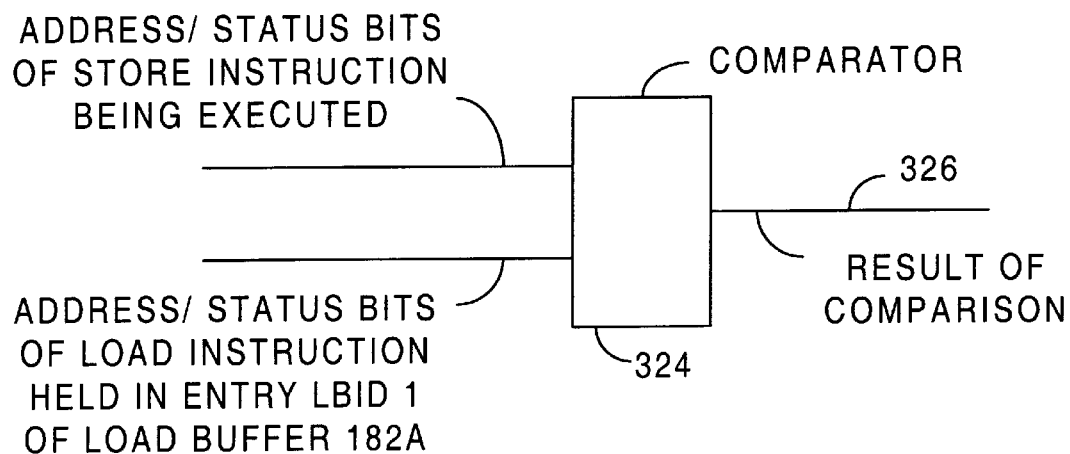
FIG. 26 illustrates a comparator comparing addresses of store and load instructions.

In one embodiment, a different comparator is associated with each entry of each of load buffers 182 to make those comparisons. One of the comparators is comparator 324, illustrated in FIG. 26. Merely as an example, comparator 324 is associated with the entry LBID 1 of load buffer 182A. Comparator 324 receives the address of a store instruction at one input and the address in the load address field of entry LBID 1 in load buffer 182A at another input. A signal on output conductor 326 signifies whether the addresses are the same. Conductor 326 as well as output conductors from other comparators are connected to MOB control circuitry 302. Comparators (such as comparator 324) may also compare status bits of the store instruction with status bits in the load buffer as described below.

Figure 28:
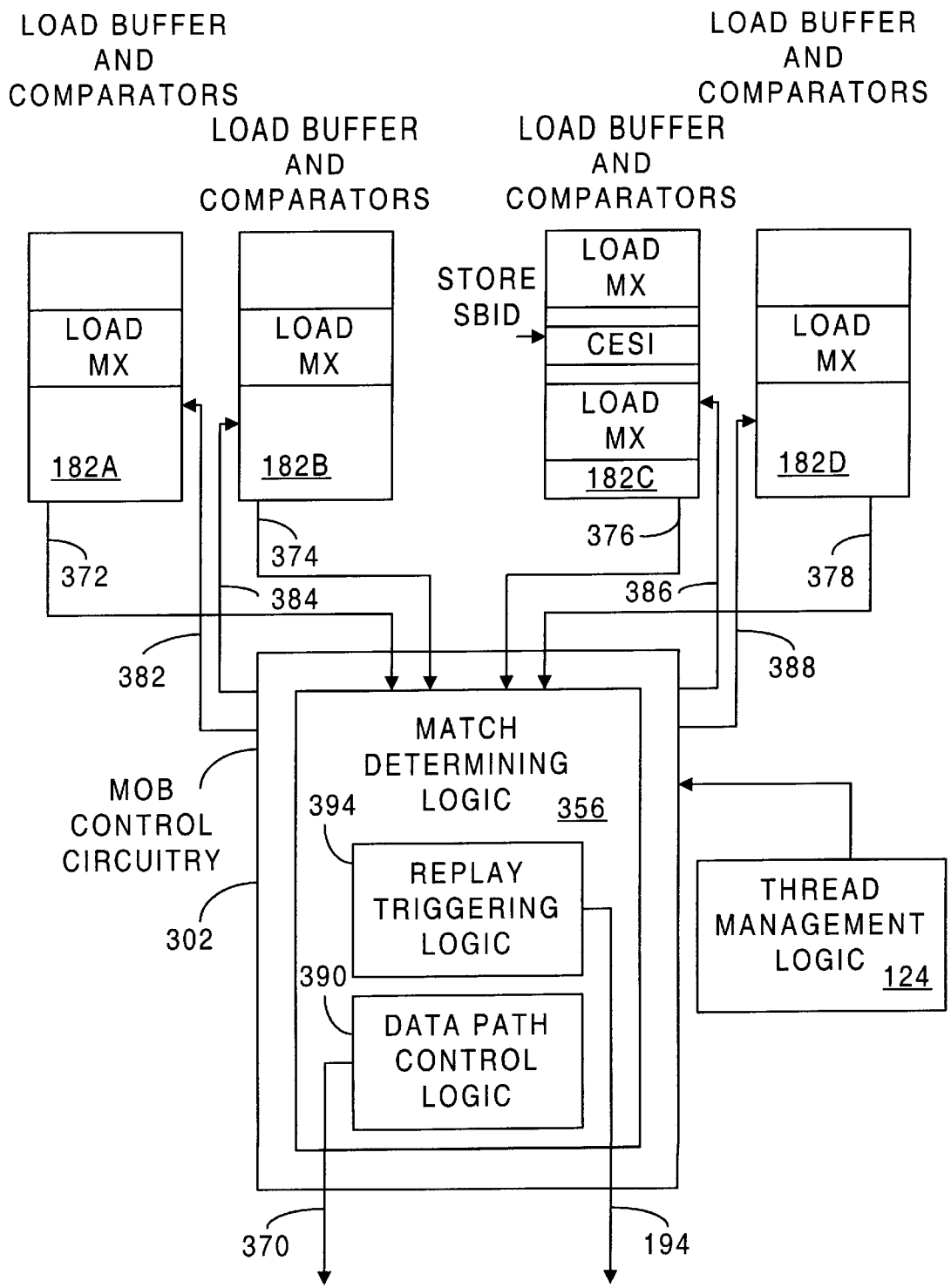
FIG. 28 is a block diagram representation of MOB control circuitry and load buffers according to one embodiment of the invention.

FIG. 28 is similar to FIG. 27. However, in FIG. 28 load instruction addresses in load buffers 182A–182D are compared with the address of a store instruction to be executed, and match determining logic 356 determines whether to replay load instructions. In one embodiment, match determining logic includes replay triggering logic 394 that provides signals on conductors 194 to indicate to the trace buffers which load instructions are to be replayed. In one embodiment, match determining logic 356 considers matches of load instructions with the store instruction beginning with the CLLI. Different algorithms may be used. Thread management logic 124 indicates those thread IDs that are later in program order than the thread ID of the store instruction being executed. In one embodiment, all comparators are enabled. In another embodiment, only the conductors in the load buffers having thread IDs equal to or later in program order than the thread ID of the load instruction are enabled. In still another embodiment, only the conductors in the load buffers associated with the CLLI and later instructions are enabled. The threads to consider can be determined before, after, or during the determination as to which load instructions within the load buffers come later in program order than the store instruction.

Under one embodiment, detection circuitry to detect certain speculation errors in execution of load instructions includes the comparators associated with the load buffers, portions of match determining logic 356, and associated control circuitry. In other embodiments, the detection circuitry could include somewhat different circuitry. It is not required that the detection circuitry to detect speculation errors be in the execution pipeline. Different match determining logic could be used in connection with data path control logic and replay triggering logic.

i. Cases in Which There is an Address Match

The status field (SB hit, SBID, Thread ID, Replay Count (if used)) for those younger instructions for which there is an address match is considered in determining whether to replay. The status field indicates whether the load instruction got its data from memory (e.g., data cache 176) or the data field of a store buffer. The SB hit field has, for example, a 0 if the data came from memory it and a 1 if the data came from the store buffer. The SBID and thread ID fields hold the SBID and thread ID of the store instruction from which the data came from. The thread ID of the store instruction is not necessarily the thread ID of the load instruction for which there is an address match. The thread ID of the load instruction is implicit in the load buffer. The replay count field (if used) indicates which replay is involved. (If the SB Hit is 0, the data in the SBID, thread ID, and replay count fields is meaningless.)

If SB Hit=0 (previous data from memory), a replay event is signaled from the load buffer over conductors 194 to the trace buffer identified by the load instruction thread ID and that load instruction and all dependent instructions are replayed from the trace buffer. The instr ID and thread ID are passed over conductors 194 to indicate which instruction is replayed.

If SB Hit=1 (previous data from store buffer), the values in the SBID field, thread ID field, and replay count field (if used) control whether a replay is triggered. In a first case, the thread ID of the status field for the particular load instruction equals the thread ID of the store instruction, and the SBID in the status field of the particular load instruction matches the SBID of the store instruction. In the first case, the load instruction is replayed if the replay count of the store instruction is larger than the replay count in the status field. If there is not a replay count (because a store instruction can only be replayed once at a time), then the load instruction is replayed.

In a second case, the thread ID in the status field equals the thread ID of the store instruction, but the SBID in the status field does not match the SBID of the store instruction. In the second case, the load instruction is replayed if the SBID in the status field is less then the SBID of the store instruction, but not replayed if the SBID in the status field is greater then the SBID of the store instruction.

In a third case, the thread IDs of the status field and store instruction do not match. It is expected that this is an infrequent case. For simplicity, under one embodiment, the load instruction is replayed (even though it may be contrary to program order). It may be a false replay. The load instruction when replayed will receive the correct store data. Other approaches could be used but they may be far more complex that is justified for such an infrequent case.

ii. Cases in Which There is Not an Address Match

If the addresses do not match, then no replay is triggered except in the following infrequent case. If SB Hit=1, the thread ID of the status field matches the thread ID of the store instruction, and the SBID of the status field matches the SBID of the store instruction. In this case, there is a replay and the replayed load instruction receives its data from a new entry or memory.

c. Reset

A thread is reset when it is determined that the thread is not in the program order. However, loads from other threads could have taken data from the data field associated with store instructions in that thread. Thread management logic 124 sends a signal to control circuitry 302. In one embodiment, when a thread is reset, the thread ID of the reset thread is compared with every load in every load buffer (except perhaps the load buffer corresponding to the reset thread). A replay is triggered for load instructions where the thread ID in the status field matches the thread ID of the reset thread. The load instructions are replayed from the appropriate trace buffers.

3. Replay of Store Instructions

As described above, load instructions are replayed in response to execution of store instructions. In one embodiment, store instructions are replayed in response to register comparisons in the trace buffers that indicate a register value has changed. For example, referring to FIGS. 12 and 13, instr IDs 4 and 5 in trace buffer 114A, which are store instructions, are shown to be dependent on registers R1–R4.

4. Replays of Multiple Load Instructions

It is possible that more than one load instruction in a load buffer will have status field match with a store instruction. In order to avoid complicated logic, one approach is for control circuitry 302 to detect when there are multiple load address matches and cause all instructions after the earliest load in the trace to be re-executed.

5. Final Retirement of Load and Store Instructions

When a load or store instruction is to be finally retired, final retirement logic 134 provides signals to trace buffers 114 and MOB 184 indicating that an instruction is to be finally retired. The entry in the trace buffer (identified by the instr ID and thread ID) is deallocated. In the case of load instructions, the entry in the load buffer (identified by the thread ID and LBID) is deallocated. In the case of load instructions, final retirement is complete. In the case of store instructions, prior to deallocation, the data in the data field must be committed to memory. Deallocation of the entry in the store buffer and hence final retirement does not occur until confirmation is received that the store is complete. Alternatively, the entry may be finally retired before confirmation, but if reallocation of the entry cannot occur until confirmation is received. Signals on conductors 200 can indicate to thread management logic 124 when the final retirement of stores is complete and the next thread can begin.

SB Retired indicates that an instruction has been retired. At the time final retirement logic 134 indicates that an instruction should be retired, a bit in the SB Retired field is asserted. Once the SB Retired field is asserted, the associated instruction is written to memory in order. As soon as MOB 184A learns that the instruction has been written to memory, the SB Retired field is deasserted and the instruction is deallocated.

Load buffer 182A and store buffer 184A may be queues with a head and a tail. The head is moved when an instruction is deallocated. In load buffer 184A, and trace buffers 114, retirement and deallocation may occur simultaneously. Final retirement logic 134 provides signals through conductors 136 and 140. Demux 188 selects whether one of load buffers 182 or store buffers 184 will receive a retirement signals. Demux 188 is optional and could be replaced by enable ports in load buffers 182 and store buffers 184.

F. Additional Information Regarding Thread Management Logic and Final Retirement Logic In one embodiment, thread management logic 124 uses a tree structure to keep track of thread order. Under the tree structure, the program order (which is also the retirement order) flows from top to bottom, and a node on the right is earlier in program order than a node on the left. A root is the first in program order. A tree is an abstract idea, whereas a tree structure is circuitry that implements the tree.

Threads begin at the instruction following a backward branch or a function call. That is, threads begin at the next instruction assuming the backward branch were not taken or the function was not called (as illustrated by threads T2 in FIGS. 4 and 5). In so doing, from the perspective of a thread (node), the program order of children nodes of the thread are in the reverse of the order in which the threads were started (created). For example, in FIG. 6, in time order, execution of thread T2 begins before execution of thread T3, but in program order, thread T3 occurs before thread T2.

In one embodiment, three events may cause a thread to be removed from the tree: (1) A thread at the root of the tree is removed when the thread is retired. When the thread at the root is retired, the thread (node) that is next in program order becomes the root and nodes are reassigned accordingly. (2) A thread that is last in program order is removed from the tree to make room for a thread higher in program order to be added to the tree. In this respect, the tree acts as a last-in-first-out (LIFO) stack. (3) A thread may be reset and thereby removed from the tree when it is discovered that the program counter of its parent thread is outside a range between a start count and an end count. In the case where a child thread is created at a backward branch (e.g., thread T4 in FIGS. 6 and 29), the start count is the target of the backward branch and the end count is the program counter value at the backward branch instruction. A thread started after a function call can also be reset because there is no return from the function, although it is quite rare for this to happen. One approach for dealing with the possibility of there being no return from a function is to ignore the possibility and let the system eventually remove the thread from the tree when it becomes the lowest in program order, as in event (2). When a thread is removed from the tree, the resources allocated for that thread (such as a trace buffer, store buffer, and load buffer) are deallocated.

Figure 29:
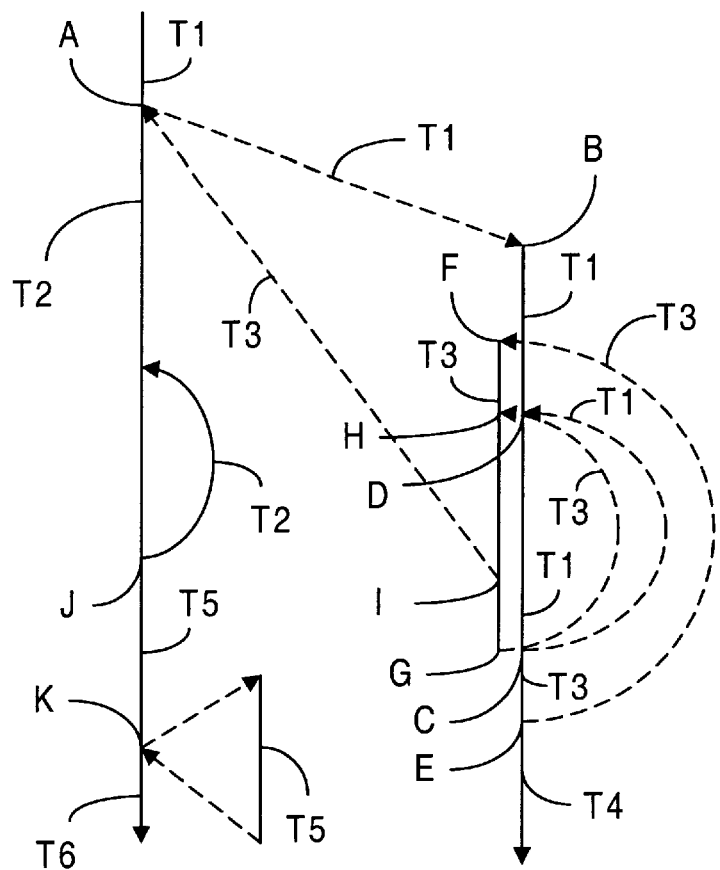
FIG. 29 is a flow diagram of an example of six threads.
Figure 30:
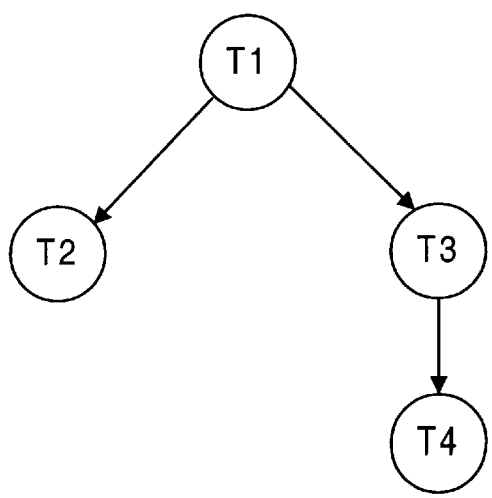
FIG. 30 is a tree illustrating a relationship in the threads of FIG. 29 at a time t1.
Figure 31:
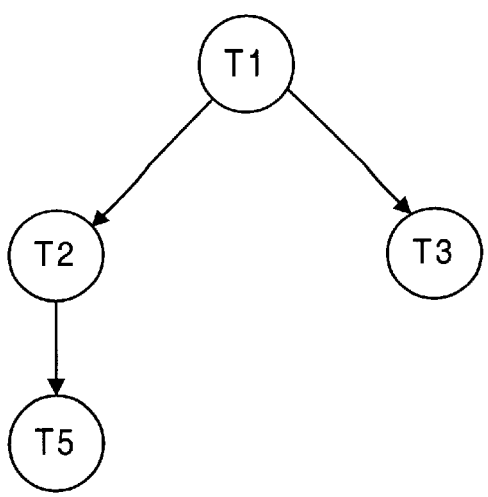
FIG. 31 is a tree illustrating a relationship in the threads of FIG. 29 at a time t2 assuming thread T4 is reset before thread T1 retires.
Figure 32:
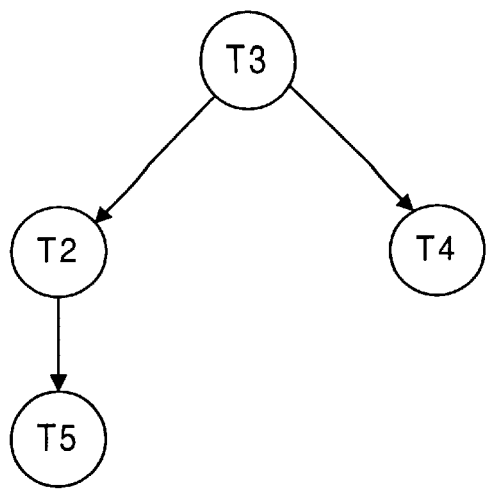
FIG. 32 is a tree illustrating a relationship in the threads of FIG. 29 at a time t2 assuming thread T1 retires before thread T4 is reset.
Figure 33:
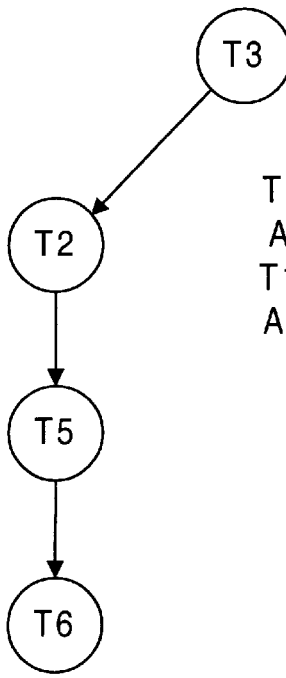
FIG. 33 is a tree illustrating a relationship in the threads of FIG. 29 at a time t3.

Events (1) and (3) are illustrated in FIG. 29, which includes the threads of the example of FIG. 6, with the addition of threads T5 and T6. Thread T5 starts following a backward branch instruction at point J and thread T6 starts following a function call at point K. It is assumed that there are only four trace buffers. FIG. 30 illustrates the tree structure at time t1. Thread T2 is added to the tree before thread T3 is added to the tree. Thread T4 is added to the tree after thread T3 is added to the tree. Threads T2 and T3 are children of thread T1. Thread T4 is a child of thread T3. Following the rules of top to bottom and right to left, the program and retirement orders are thread T1, T3, T4, and T2. FIG. 31 illustrates the tree structure at time t2 assuming that thread T4 is reset before thread T1 retires. The program and retirement orders are thread T1, T3, T2, and T5. FIG. 32 illustrates the tree structure at time t2 assuming that thread T1 retires before thread T4 is reset. The program and retirement orders are thread T3, T4, T2, and T5. FIG. 33 illustrates the tree structure at time t3, which is after the time thread T1 retires and thread T4 is reset. The program and retirement orders are T3, T2, T5 and T6.

Figure 34:
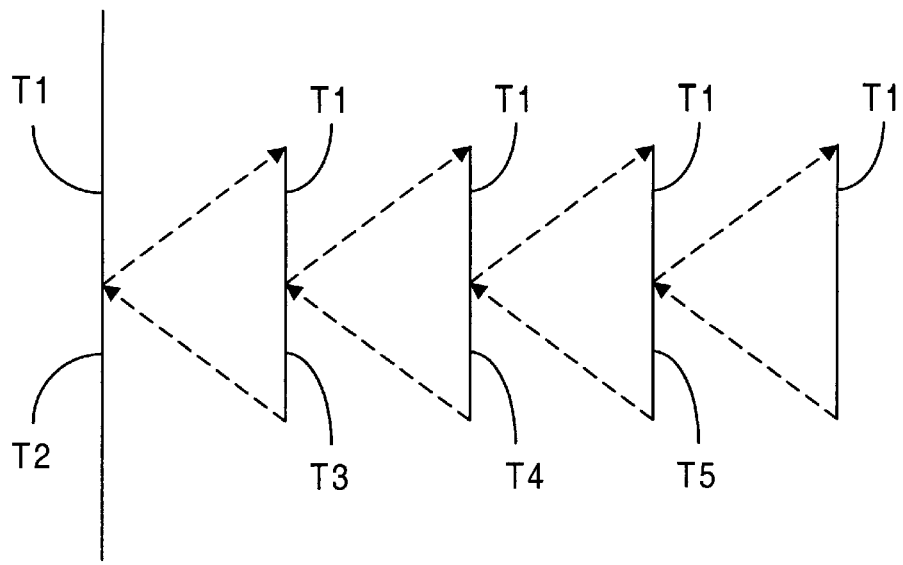
FIG. 34 is a flow diagram illustrating an example with five threads.
Figure 35:
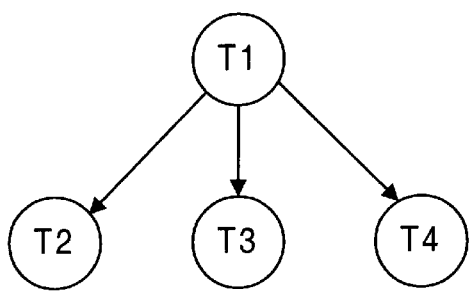
FIG. 35 is a tree illustrating a relationship in the threads of FIG. 34 at a time t1.
Figure 36:
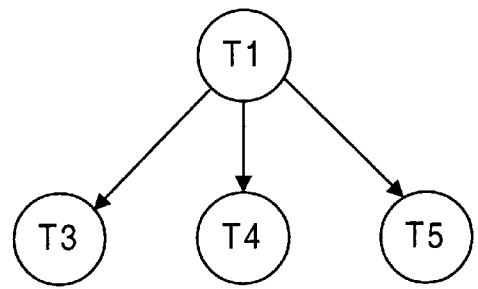
FIG. 36 is a tree illustrating a relationship in the threads of FIG. 34 at a time t2.

Event (2) is illustrated in FIG. 34, which includes nested functions. In time order, the threads are created (started) in the order T1, T2, T3, T4, and T5. However, the program order is T1, T5, T4, T3, and T2. In the example, there are only four trace buffers. Therefore, not all five threads exist at the same time. FIG. 35 illustrates the tree structure at time t1, which is before thread T5 has started. Program and retirement order are T1, T4, T3, and T2. Thread T5 is not yet part of the tree structure. FIG. 36 illustrates the tree structure at time t2, which is after thread T5 has started. Thread T2, which is lowest is program order, is removed from the tree structure to make room for thread T5. A thread that is removed from the tree may be restarted at a later time. Alternatively, another thread may execute all or part of the instructions of the thread removed from the tree. In one embodiment, in the case of reset, a thread may seek to join the next following thread rather than the reset thread. Alternatively, the thread may just continue until otherwise ended. The functions of array 198 may be performed in the nodes of the tree.

The thread IDs of the children threads are properly positioned according to program order in the tree structure. (Although the program order as determined by thread management logic 124 might change.) A thread is finished when it joins or matches the program count of the next thread in the tree in program order. If there is only one child of the thread, then that is the next thread in program order. For example, in FIG. 33, thread T2 is the next thread in the tree in program order.

Final retirement logic 134 gains information from the tree structure to assemble array 198 or straight from the circuitry of the tree structure. There may be decoding circuitry between the tree structure and other logic of thread management logic 124 and logic of final retirement logic 134. Array 198 may not be required.

In summary, the tree structure provides information for at least the following purposes: (1) the tree specifies retirement order; (2) the tree specifies program order, which is used by, for example, MOB 178 as described above; (3) the tree specifies an end point of a thread by indicating the starting instruction of another thread; (4) the tree is used in thread resource allocation by indicating which resources are available and which resources get deallocated.

G. An Embodiment Without Multithreading

Figure 3:
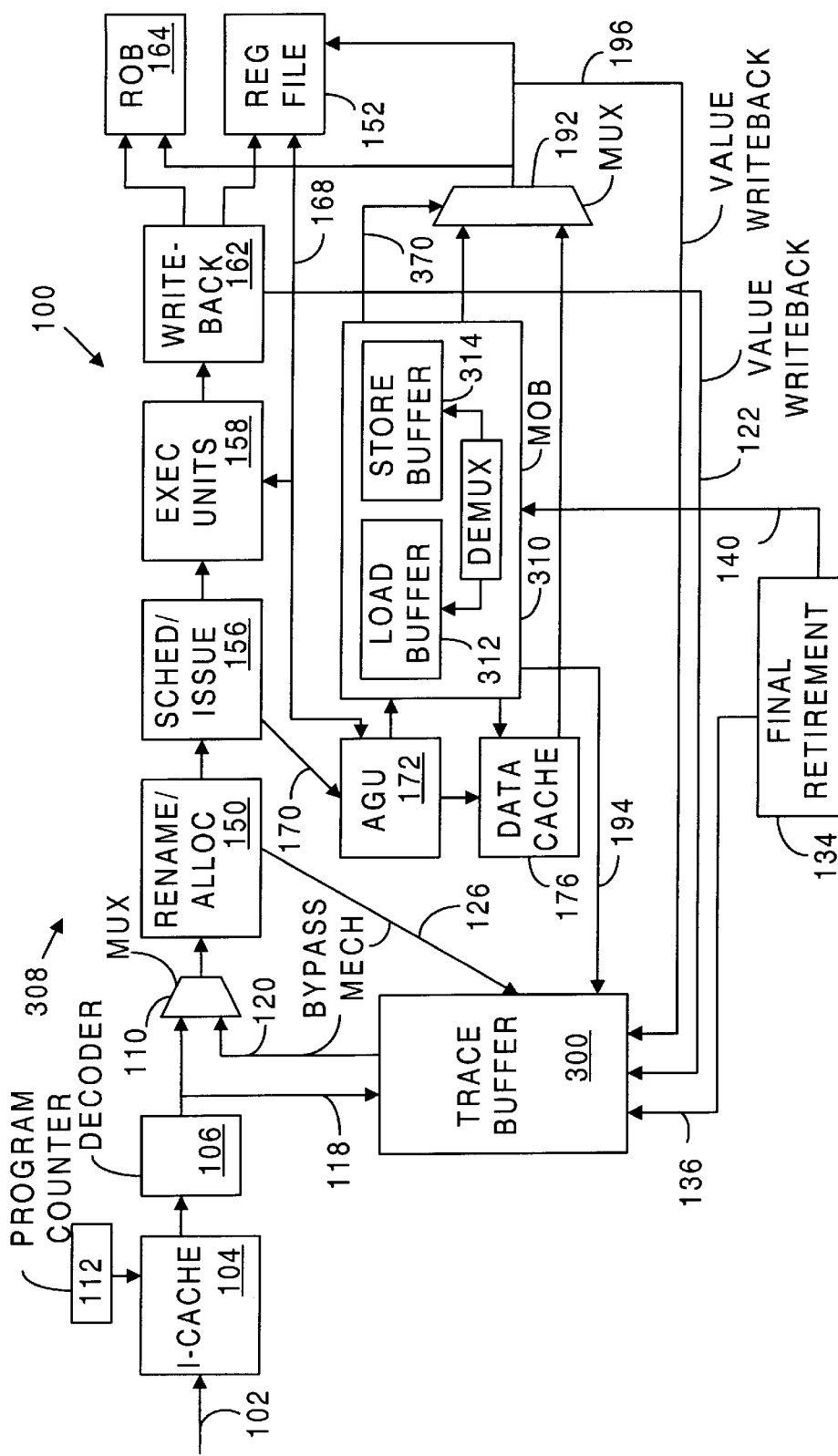
FIG. 3 is a block diagram of a processor according to another embodiment of the invention.

FIG. 3 illustrates a processor 100 including a pipeline 308. Processor 100 is similar to processor 50. However, a trace buffer 300 is the only trace buffer and a MOB 310 is the only MOB. Processor 50 is not designed to process multiple threads. Therefore, thread management logic is not required for processor 100. Trace buffer 300 may be similar to trace buffer 114A, for example, except that multithread specific components are not required. For example, conductors 216 and output register file 210 would not be needed. Various circuitry may be used to detect speculation errors, including well known circuitry. MOB 310 may be similar to MOB 178A, for example, except that multithread specific features are not required. For example, a thread ID field would not be needed in the load buffer. Other components of processor 100 may be modified somewhat with respect to their configuration in processor 50 to remove multithreading related features. Trace buffer 300 and MOB 310 may be used in connection with various speculations and recovery from errors therein. The trace buffer allows a large number of instructions to be held outside the pipeline for possible replay before final retirement.

Processor 50 could be used in connection with a non-multithread program. In that case, thread management logic 124 could always keep the same thread ID in program order. Alternatively, thread management logic 124 could be disabled. In the non-multithread case, only one of trace buffers 114 and only one of the MOBs 178 are used. Alternatively, trace buffers could be combined to make a larger trace buffer and MOBs could be combined to make a larger MOB.

H. Additional Information and Embodiments

Figure 37:
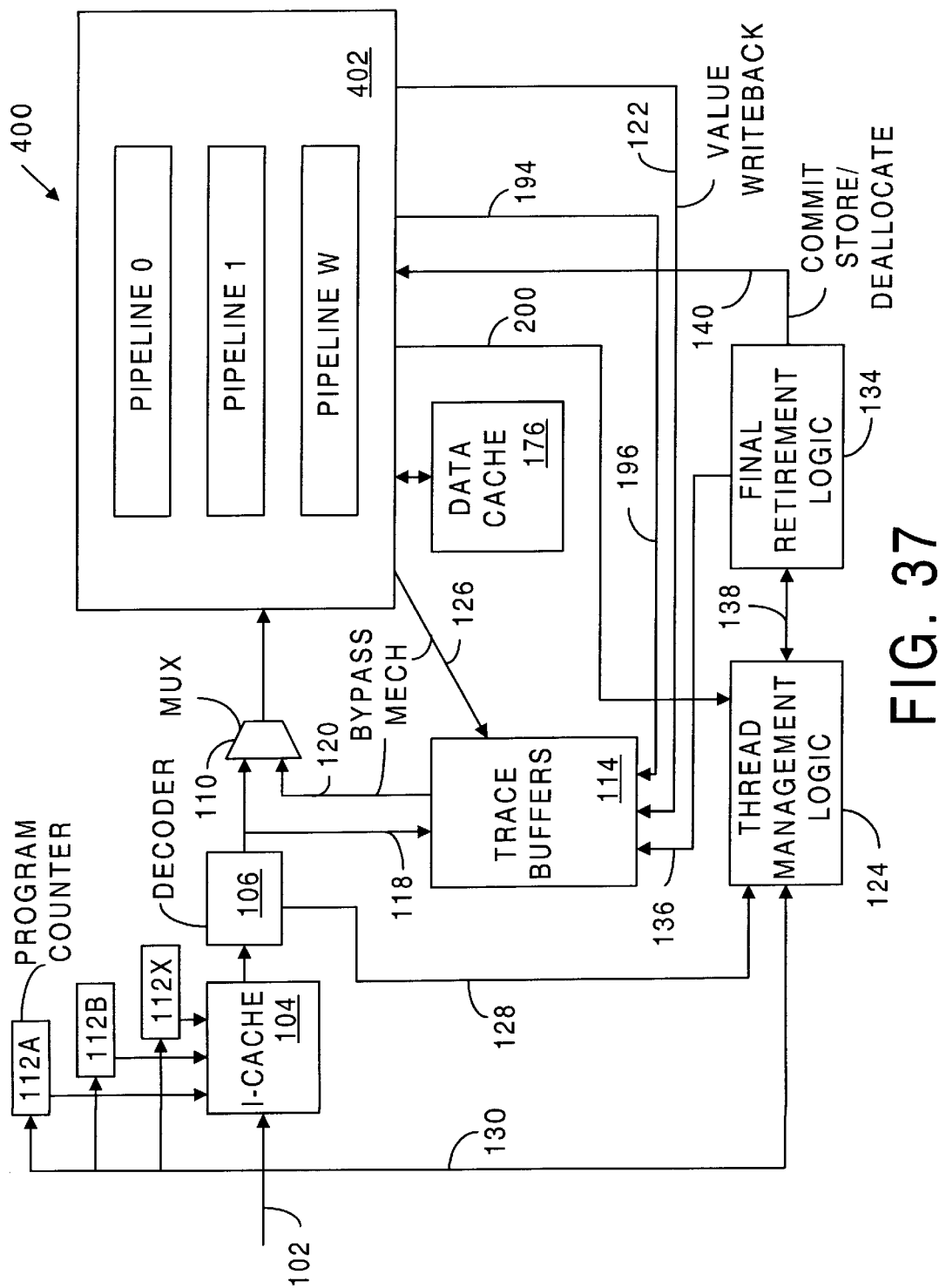
FIG. 37 is a block diagram presentation of a processor according to an alternative embodiment to that of FIG. 2.

Referring to FIG. 37, a processor 400 is a multi-processor (W) chip including multi-pipeline unit 402. Multi-pipeline unit 400 differs from shared resource pipeline 108 of FIG. 2 in that an entire pipeline (e.g., separate rename/allocate unit for each pipeline) is included with each of pipelines 0, 1, . . . W of multi-pipeline unit 402. (W may equal to or more or less than X.) Otherwise, processor 400 may be essential the same as or very different than processor 50. Other processors may include some features of multi-pipeline unit 402 and some features of pipeline 108.

Figure 38:
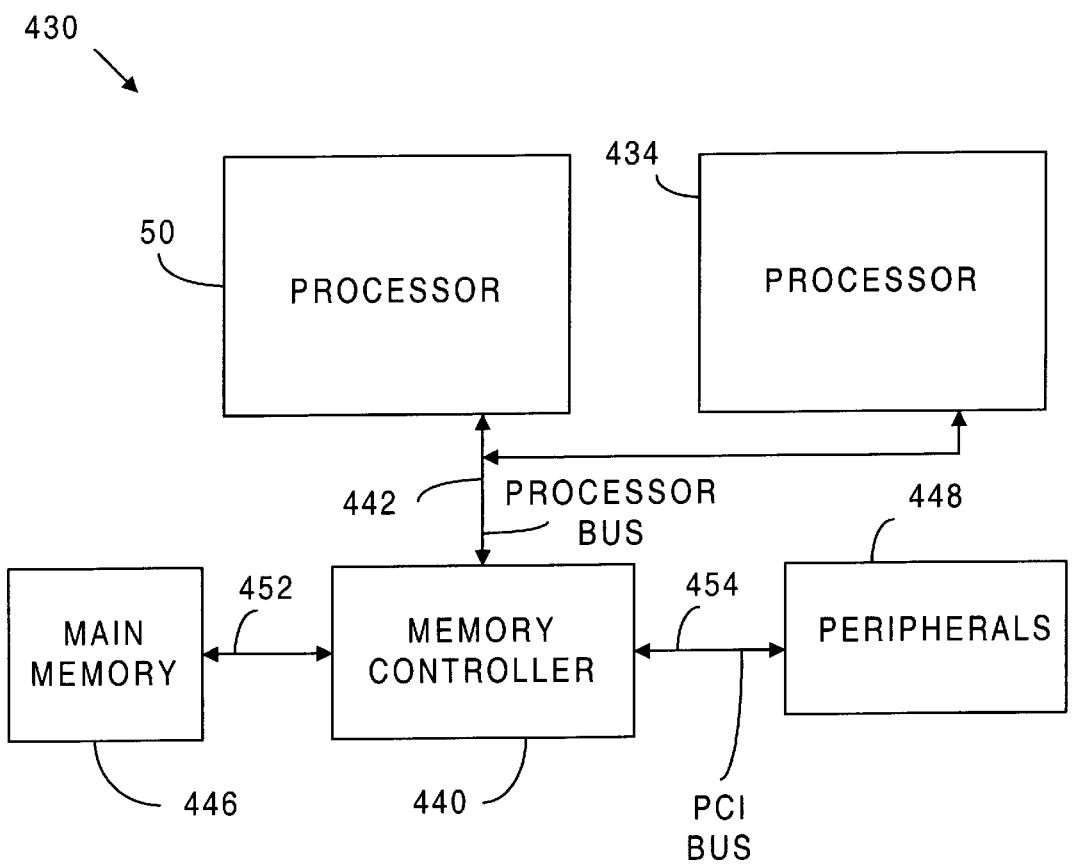
FIG. 38 is a computer system including the processor of FIG. 2.

Each of the processors mentioned herein, may be included in a part of a variety of computer systems. Referring to FIG. 38, merely as an example, processor 50 may be part of a computer system 430. System 430 may also include a second processor 434. An on-chip second level (L2) cache may be including within processor 50. Processor 50 may communicate with a memory controller 440 through a processor bus 442. Memory controller 440 may communicate with main memory 446 and peripherals 448 through buses 452 and 454.

A pipeline similar to pipeline 108 or 308 (in FIGS. 2 and 3) could be used in a processor that does not use register renaming. In such a case, the components that are involved in register renaming (e.g., rename/allocate unit 150) could be modified to remove renaming related features.

The circuits and details that are described and illustrated are only exemplary. Various other circuits and details could be used in their place. Further, there may be various design tradeoffs in size, latency, etc. For example, the maximum operating clock frequency may have to be reduced if buffers in the execution path (e.g., in the reservation station, register file, ROB) are too large. The components illustrated herein may be designed and constructed accordingly to various techniques.

There may be intermediate structure (such as a buffer) or signals between two illustrated structures. Some conductors may not be continuous as illustrated, but rather be broken up by intermediate structure. The borders of the boxes in the figures are for illustrative purposes. An actual device would not have to include components with such defined boundaries. The relative size of the illustrated components is not to suggest actual relative sizes. Arrows shown certain data flow in certain embodiments, but not every signal, such as data requests. Where a logical high signal is described above, it could be replaced by a logical low signal and vice versa.

The components illustrated in a processor may all be on the same processor chip. Alternatively, for example, the trace buffers could be on a different chip than the execution pipeline.

The terms "connected," "coupled," and related terms are not limited to a direct connection or a direct coupling, but may include indirect connection or indirect coupling. The term "responsive" and related terms mean that one signal or event is influenced to some extent by another signal or event, but not necessarily completely or directly. If the specification states a component "may", "could", or is "preferred" to be included, that particular component is not required to be included.

A MOB could use data matching rather than address matching to detect misspeculation.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A processor, comprising:
    an execution pipeline to execute instructions of a program, wherein at least some of the instructions are executed speculatively; and
    a trace buffer outside the execution pipeline to hold at least some of the instructions, including at least some of the speculatively executed instructions, and results of at least some of the instructions, including at least some of the speculatively executed instructions, and wherein at least some of the instructions held in the trace buffer are associated with speculation errors and are re-executed in the execution pipeline from the trace buffer as part of execution of the program.

2. The processor of claim 1, wherein at least some of the instructions are subject to an initial retirement at the conclusion of their execution in the execution pipeline, but wherein these instructions remain in the trace buffer until a final retirement.

3. The processor of claim 1, further comprising final retirement logic to signal to the trace buffer to deallocate entries in the trace buffer holding instructions to be finally retired.

4. The processor of claim 1, wherein the execution pipeline may be used in shared resource multithreading.

5. The processor of claim 1, wherein the trace buffer is a first trace buffer and the processor further comprises additional trace buffers and wherein the first and additional trace buffers hold traces from different threads.

6. The processor of claim 1, wherein the execution unit includes a register rename unit and the trace buffer provides control bits that accompany the instructions being replayed.

7. The processor of claim 6, wherein depending on the instruction being replayed and the state of the control bits, the register rename unit bypasses renaming a register associated with the instruction.

8. The processor of claim 6, wherein depending on the instruction being replayed and the state of the control bits, the register rename unit (1) does register renaming, (2) bypasses renaming and instead uses a physical register identification number from the trace buffer, or (3) uses a value from the trace buffer as a constant.

9. The processor of claim 1, further comprising a decoder and wherein the execution pipeline and the trace buffer receive instructions from the decoder concurrently.

10. The processor of claim 1, further comprising a cache and a decoder and wherein the cache receives instructions from the decoder and the execution pipeline and the trace buffer receive instructions from the cache concurrently.

11. The processor of claim 1, wherein the instructions associated with speculation errors are replayed in the execution pipeline from the trace buffer, and the re-execution is part of the replaying.

12. The processor of claim 1, wherein the processor is in a computer system.

13. A processor comprising:
    an execution pipeline to execute instructions, wherein at least some of the instructions are executed specultively; and
    a trace buffer outside the execution pipeline to hold at least one of the instructions, including at least some of the speculatively executed instructions, and results of execution of at least some of the instructions, including at least some of the speculatively executed instructions, wherein at least some of the instructions are subject to an initial retirement following execution in the pipeline, but remain in the trace buffer until a final retirement.

14. The processor of claim 13, further including detection circuitry to detect speculation errors in the execution of the instructions.

15. The processor of claim 13, wherein at least part of the detection circuitry is included within the trace buffer.

16. The processor of claim 13, further including detection circuitry to detect speculation errors in the execution of the instructions and replay triggering circuitry to trigger replay of at least some of the instructions associated with speculation errors.

17. The processor of claim 13, wherein the trace buffer is one of multiple trace buffers outside the execution pipeline to hold traces of threads, and wherein the execution pipeline concurrently executes at least portions of the threads.

18. The processor of claim 13, further comprising final retirement logic and wherein the instructions within the trace buffer are finally retired under the control of the final retirement logic, but some of the instruction may be initially retired following execution in the execution pipeline.

19. The processor of claim 13, wherein the trace buffer includes an instruction queue array.

20. The processor of claim 13, further comprising a decoder and wherein the execution pipeline and the trace buffer receive instructions from the decoder concurrently.

21. A processor comprising:
    an execution pipeline to execute instructions of a program, wherein at least some of the instructions are executed speculatively; and a trace buffer outside the execution pipeline to hold the instructions, and wherein the instructions may be re-executed from the trace buffer in response to detected speculation errors and wherein the instructions remain in the trace buffer until it is assured they are executed correctly or are not to be executed as part of the program.

22. The processor of claim 21, wherein the instructions associated with speculation errors are replayed in the execution pipeline from the trace buffer, and the re-execution is part of the replaying.

23. A processor comprising:
   an execution pipeline to concurrently execute at least portions of different threads; and
   trace buffers outside the execution pipeline to each hold instructions of one of the threads, wherein each of the trace buffers includes an output register file to hold a register context of the associated one of the threads and an input register file to receive the register context of the immediately preceding thread in program order.

24. The processor of claim 23, wherein the trace buffers include comparison circuitry to compare contents of one of the output register files with contents of one of the input register files.

25. The processor of claim 24, wherein the comparison is only made at the end of the retirement of the preceding one of the threads.

26. A processor, comprising:
   a trace buffer outside the execution pipeline to hold instructions;
   an execution pipeline to execute at least some instructions, wherein at least some of the executed instructions are executed speculatively; and
   the trace buffer being separate from a source of the instructions to the execaution pipeline and wherein at least some of the instructions held in the trace buffer are associated with speculation error are re-executed in the execution pipeline from the trace buffer.

* * * * *

UNITED STATES PATENT AND TRADEMARK OFFICE
CERTIFICATE OF CORRECTION

PATENT NO.    : 6,240,509 B1
DATED         : May 29, 2001
INVENTOR(S)   : Akkary It is certified that error appears in the above-identified patent and that said Letters Patent is hereby corrected as shown below:

Column 4,
Line 24, delete "fall", insert -- full --.

Column 6,
Line 66, delete "MUI", insert -- MUX --.

Column 9,
Line 9, delete "renamne", insert -- rename --.

Column 10,
Line 25, after "from", delete "[]".

Column 11,
Line 29, delete "10", insert -- I0 --.

Column 24,
Line 6, delete "if".

Signed and Sealed this

Fourth Day of June, 2002

Attest:

JAMES E. ROGAN
Attesting Officer        Director of the United States Patent and Trademark Office

UNITED STATES PATENT AND TRADEMARK OFFICE
CERTIFICATE OF CORRECTION

PATENT NO. : 6,240,509 B1
APPLICATION NO. : 08/991269
DATED : May 29, 2001
INVENTOR(S) : Haitham Akkary It is certified that error appears in the above-identified patent and that said Letters Patent is hereby corrected as shown below:

In claim 26, column 30, line 9, delete "outside the execution pipeline" and replace with --outside an execution pipeline--

In claim 26, column 30, line 11, delete "an execution pipeline to execute" and replace with --the execution pipeline to execute"

In claim 26, column 30, line 15, delete "to the execaution pipeline" and replace with --to the execution pipeline--.

Signed and Sealed this
Twentieth Day of March, 2012

David J. Kappos
*Director of the United States Patent and Trademark Office*